(12) United States Patent
Koseoglu et al.

(10) Patent No.: US 10,293,332 B2
(45) Date of Patent: May 21, 2019

(54) HYDROCRACKING CATALYST FOR HYDROCARBON OIL, METHOD FOR PRODUCING HYDROCRACKING CATALYST, AND METHOD FOR HYDROCRACKING HYDROCARBON OIL WITH HYDROCRACKING CATALYST

(71) Applicants: SAUDI ARABIAN OIL COMPANY, Dhahran (SA); JGC CATALYST AND CHEMICALS LTD., Kanagawa (JP); JAPAN COOPERATION CENTER, PETROLEUM, Tokyo (JP)

(72) Inventors: Omer Refa Koseoglu, Dhahran (SA); Adnan Al-Hajji, Dhahran (SA); Ali Mahmoud Al-Somali, Dhahran (SA); Ali H. Al-Abdul'Al, Dhahran (SA); Mishaal Al-Thukair, Dhahran (SA); Masaru Ushio, Kanagawa (JP); Ryuzo Kuroda, Fukuoka (JP); Takashi Kameoka, Fukuoka (JP); Koji Nakano, Fukuoka (JP); Yuichi Takamori, Fukuoka (JP)

(73) Assignees: Saudi Arabian Oil Company, Dhahran (SA); JGC Catalyst and Chemicals Ltd., Kanagawa (JP); Japan Cooperation Center, Petroleum, Tokyo (JP)

( * ) Notice: Subject to any disclaimer, the term of this patent is extended or adjusted under 35 U.S.C. 154(b) by 0 days.

(21) Appl. No.: 16/141,047

(22) Filed: Sep. 25, 2018

(65) Prior Publication Data
US 2019/0022630 A1 Jan. 24, 2019

Related U.S. Application Data

(63) Continuation of application No. 14/931,328, filed on Nov. 3, 2015, now Pat. No. 10,081,009, which is a (Continued)

(30) Foreign Application Priority Data

Aug. 2, 2010 (JP) .................................. 2010-173665

(51) Int. Cl.
*B01J 29/16* (2006.01)
*B01J 29/08* (2006.01)
(Continued)

(52) U.S. Cl.
CPC ........... *B01J 29/166* (2013.01); *B01J 23/755* (2013.01); *B01J 29/088* (2013.01); *B01J 29/80* (2013.01);
(Continued)

(58) Field of Classification Search
CPC ...... B01J 29/088; B01J 29/166; B01J 29/755; B01J 29/80; B01J 29/89; B01J 23/755;
(Continued)

(56) References Cited

U.S. PATENT DOCUMENTS 4,255,288 A * 3/1981 Cull .................. C10G 49/08
502/66
6,132,594 A * 10/2000 Okazaki ................ B01J 29/084
208/111.01

* cited by examiner

*Primary Examiner* — Brian A McCaig
(74) *Attorney, Agent, or Firm* — Abelman, Frayne & Schwab

(57) ABSTRACT

The present invention relates to a hydrocracking catalyst for hydrocarbon oil comprising a support containing a framework-substituted zeolite-1 in which zirconium atoms and/or hafnium atoms form a part of a framework of an ultrastable y-type zeolite and a hydrogenative metal component carried thereon and a method for producing the same. The hydrocracking catalyst of the present invention makes it easy to diffuse heavy hydrocarbon oils such as VGO, DAO and the like into mesopores, is improved in a cracking activity and makes it possible to obtain a middle distillate at a high yield as compared with catalysts prepared by using zeolite comprising titanium and/or zirconium carried thereon.

19 Claims, 4 Drawing Sheets

Related U.S. Application Data continuation of application No. 13/809,297, filed as application No. PCT/US2011/046272 on Aug. 2, 2011, now Pat. No. 9,221,036.

(51) Int. Cl.

| | | |
|---|---|---|
| *B01J 29/80* | (2006.01) | |
| *B01J 29/89* | (2006.01) | |
| *B01J 23/755* | (2006.01) | |
| *B01J 35/10* | (2006.01) | |
| *B01J 37/02* | (2006.01) | |
| *C10G 47/16* | (2006.01) | |
| *C10G 47/20* | (2006.01) | |

(52) U.S. Cl.
CPC ........... *B01J 29/89* (2013.01); *B01J 35/1019* (2013.01); *B01J 35/1023* (2013.01); *B01J 37/0201* (2013.01); *C10G 47/16* (2013.01); *C10G 47/20* (2013.01); *B01J 2229/16* (2013.01); *B01J 2229/183* (2013.01); *B01J 2229/37* (2013.01); *B01J 2229/42* (2013.01); *C10G 2300/107* (2013.01); *C10G 2300/1074* (2013.01); *C10G 2300/1077* (2013.01); *C10G 2300/301* (2013.01); *C10G 2300/4006* (2013.01); *C10G 2300/4012* (2013.01); *C10G 2300/4018* (2013.01); *C10G 2400/06* (2013.01); *C10G 2400/08* (2013.01)

(58) Field of Classification Search
CPC ................ B01J 35/1019; B01J 35/1023; B01J 37/0201; C10G 47/16; C10G 47/20
See application file for complete search history.

HYDROCRACKING CATALYST FOR HYDROCARBON OIL, METHOD FOR PRODUCING HYDROCRACKING CATALYST, AND METHOD FOR HYDROCRACKING HYDROCARBON OIL WITH HYDROCRACKING CATALYST

RELATED APPLICATIONS

This application is a CONTINUATION of U.S. patent application Ser. No. 14/931,328 filed Nov. 3, 2015, which is a CONTINUATION of U.S. patent application Ser. No. 13/809,297 filed Mar. 27, 2013, which is a § 371 of PCT/US2011/046272 filed Aug. 2, 2011 and claims priority from Japanese Patent No. 2010-173665 filed Aug. 2, 2010, all incorporated by reference in their entirety.

BACKGROUND OF THE INVENTION

1. Field of the Invention

The present invention relates particularly to a hydrocracking catalyst for hydrocarbon oil, the catalyst being capable of producing middle distillates (kerosene and gas oil; kerosene-gas oil) from heavy hydrocarbons, such as vacuum gas oil (hereinafter, also referred to as "VGO") and deasphalted oil (also referred to as "DAO"), in high yield.

2. Description of the Related Art

Hitherto, hydrotreating catalysts including zeolites in which titanium and/or zirconium is carried on (combined with) on mesopores have been used for treating bottom oil (see, for example, Japanese Unexamined Patent Application Publication Nos. 2000-334305, 2002-255537, and 2003-226519).

For example, Japanese Unexamined Patent Application Publication No. 2000-334305 discloses a hydrogenation catalyst including a hydrogenative metal carried on a catalyst support that is composed of a zeolite in which ultrafine particles composed of a titanium-group metal oxide of titania or zirconia are combined with inner surfaces of mesopores and that has an atomic ratio of aluminum to silicon in the zeolite, i.e., [Al]/[Si], of 0.01 to 0.1 (in other words, a molar ratio of $SiO_2$ to $Al_2O_3$ (hereinafter referred to as a "$SiO_2/Al_2O_3$ molar ratio" or "a silica-alumina ratio") of 20 to 200). It is described therein that the zeolite combined with the ultrafine particles composed of the titanium-group metal oxide are prepared by bringing a raw-material zeolite with mesopores into contact with an aqueous solution of a titanium-group metal salt of titania or zirconia at a pH of 0.8 to 2, washing the zeolite with water, drying the resulting zeolite, and firing the dry zeolite at 400° C. to 600° C.

Japanese Unexamined Patent Application Publication No. 2002-255537 discloses a zeolite having a high mesopore content, an atomic ratio of aluminum to silicon, i.e., [Al]/[Si], of 0.01 to 0.2 (in other words, a silica-alumina ratio of 10 to 200), a volume percent of the mesopores each having a pore diameter of 50 to 1000 Å of 30% to 50%, a volume of the mesopores of 0.14 cc/g or more, and a proportion of tetracoordinated aluminum atoms with respect to all aluminum atoms of 25 atomic percent or more, in which metal oxide ultrafine particles of titania and/or zirconia, which is not readily reduced, are combined with inner surfaces of mesopores of the above zeolite, and a hydrotreating catalyst including a hydrogenative metal carried on a catalyst support composed of the above zeolite. The zeolite having a high mesopore content is prepared by bringing a raw-material zeolite into contact with a strongly acidic aqueous solution at a pH of 0.8 to 2, drying the zeolite at 50° C. to 200° C., and firing the dry zeolite at 350° C. to 600° C. It is described therein that it is thus possible to prepare a zeolite in which metal oxide ultrafine particles are combined with (carried on) inner surfaces of pores.

Japanese Unexamined Patent Application Publication No. 2003-226519 discloses a hydrotreating catalyst for hydrocarbon oil, the hydrotreating catalyst including a modified zeolite in which a faujasite zeolite having a crystal lattice constant of 24.28 Å or more and 24.46 Å or less contains a metal element (titanium, zirconium, or hafnium) in the 4th group of the periodic table, the modified zeolite having a metal element content of 0.1% to 10% by weight on an elemental metal basis, an Al/Si atomic ratio of 0.01 to 0.1 (in other words, a silica-alumina ratio of 20 to 200), and further containing a hydrogenative metal. It is described therein that the modified zeolite is prepared by bringing a faujasite zeolite having a crystal lattice constant of 24.28 Å to 24.46 Å into contact with an aqueous solution containing a water-soluble compound of an element in the 4th group of the periodic table under acidic conditions.

In these hydrotreating catalysts, however, the mesopores are clogged with the carried metals, and therefore these catalysts were not suited in a certain case to hydrotreating (or hydrocracking) of heavy hydrocarbon oil such as VGO and DAO.

As disclosed in WO2007/032232, hydrotreating catalyst including as a support, a Y-type zeolite containing a titanium atom incorporated into a zeolite framework (in other words, a Y-type zeolite in which aluminum atoms constituting the framework are substituted with titanium atoms) has been developed. The above zeolite can be prepared by treating a Y-type zeolite with an acidic aqueous solution containing titanium at a pH of 1.5 or less, followed by filtering, washing, and drying. Thereby, the zeolite can be made to contain titanium atoms incorporated into a zeolite framework structure without clogging mesopores. It is described that when the hydrotreating catalyst including the above zeolite as a support is applied to hydrotreating of heavy hydrocarbon oil, yields of middle distillates are improved because heavy hydrocarbon oil is readily diffused into mesopores.

SUMMARY OF THE INVENTION

The hydrotreating catalyst including as a support, the zeolite in which a part of aluminum atoms constituting the zeolite framework is replaced with titanium atoms, however, has excessively high reactivity (decomposition activity) and excessively decomposes kerosene-gas oil, thus disadvantageously reducing yields of middle distillates.

The present invention has been made in light of the foregoing circumstances. It is an object of the present invention to provide a hydrocracking catalyst for hydrocarbon oil, the hydrocracking catalyst capable of providing middle distillates in high yield, a method for producing the hydrocracking catalyst, and a hydrocracking method using the hydrocracking catalyst.

The hydrocracking catalyst for hydrocarbon oil according to the present invention in accordance with the object described above is a hydrocracking catalyst for hydrocarbon oil comprising a hydrogenative metal component carried on a support containing an ultra-stable Y-type zeolite, wherein the above ultra-stable Y-type zeolite is a framework-substituted zeolite (hereinafter referred to as a framework-substituted zeolite-1) in which a part of aluminum atoms constituting a zeolite framework thereof is substituted with zirconium atoms and/or hafnium atoms.

In the hydrocracking catalyst for hydrocarbon oil according to the present invention, 0.1 to 5% by mass of zirconium atoms and/or hafnium atoms in terms of oxides is preferably contained in the framework-substituted zeolite-1 described above.

In the hydrocracking catalyst for hydrocarbon oil according to the present invention, the framework-substituted zeolite-1 further contains preferably titanium atoms.

In the hydrocracking catalyst for hydrocarbon oil according to the present invention, a part of aluminum atoms constituting the zeolite framework in the framework-substituted zeolite-1 is replaced preferably with titanium atoms.

In the hydrocracking catalyst for hydrocarbon oil according to the present invention, 0.1 to 5% by mass of titanium atoms in terms of oxide is preferably contained in the framework-substituted zeolite-1.

In the hydrocracking catalyst for hydrocarbon oil according to the present invention, the support described above preferably contains the framework-substituted zeolite-1 and inorganic oxides excluding the above framework-substituted zeolite-1.

In the hydrocracking catalyst for hydrocarbon oil according to the present invention, the inorganic oxide described above is preferably alumina or silica-alumina.

In the hydrocracking catalyst for hydrocarbon oil according to the present invention, the support described above further contains preferably a framework-substituted zeolite (hereinafter referred to as a framework-substituted zeolite-2) in which a part of aluminum atoms constituting a zeolite framework of the ultra-stable Y-type zeolite is substituted only with titanium atoms.

In the hydrocracking catalyst for hydrocarbon oil according to the present invention, when the support described above contains the framework-substituted zeolite-2, the above framework-substituted zeolite-2 preferably contains 0.1 to 5% by mass of titanium atoms in terms of oxide.

In the hydrocracking catalyst for hydrocarbon oil according to the present invention, the support described above preferably comprises the framework-substituted zeolite-1, the framework-substituted zeolite-2 and inorganic oxides excluding the above framework-substituted zeolite-1 and the above framework-substituted zeolite-2.

In the hydrocracking catalyst for hydrocarbon oil according to the present invention, the framework-substituted zeolite-1 contained in the support preferably has the following properties (a) to (c):
(a) a crystal lattice constant of 2.430 to 2.450 nm,
(b) a specific surface area of 600 to 900 m$^2$/g and
(c) a molar ratio of 20 to 100 in terms of SiO$_2$ to Al$_2$O$_3$.

In the hydrocracking catalyst for hydrocarbon oil according to the present invention, a specific surface area thereof falls preferably in a range of 200 to 450 m$^2$/g; a volume of pores having a diameter of 600 Å or less falls preferably in a range of 0.40 to 0.75 ml/g; and a carrying amount of the hydrogenative metal component falls preferably in a range of 0.01 to 40% by mass.

The method for producing a hydrocracking catalyst for hydrocarbon oil in the present invention is a method for producing a hydrocracking catalyst for hydrocarbon oil comprising a hydrogenative metal component carried on a support containing the framework-substituted zeolite-1 in which a part of aluminum atoms constituting a framework of an ultra-stable Y-type zeolite is substituted with zirconium atoms and/or hafnium atoms, and the framework-substituted zeolite-1 described above is obtained by firing an ultra-stable Y-type zeolite having a crystal lattice constant falling in a range of 2.430 nm or more and 2.450 nm or less, a specific surface area of 600 to 900 m$^2$/g and a molar ratio of 20 to 100 in terms of SiO$_2$ to Al$_2$O$_3$ at 500 to 700° C., preparing a suspension having a mass ratio of 5 to 15 in terms of liquid/solid from the above fired ultra-stable Y-type zeolite, adding an inorganic acid or an organic acid thereto so that a pH of the above suspension is 1.0 to 2.0, subsequently adding a zirconium compound and/or a hafnium compound and mixing them and then neutralizing the suspension.

In another method for producing a hydrocracking catalyst for hydrocarbon oil in the present invention, a zeolite obtained by firing an ultra-stable Y-type zeolite having a crystal lattice constant falling in a range of 2.430 nm or more and 2.450 nm or less, a specific surface area of 600 to 900 m$^2$/g and a molar ratio of 20 to 100 in terms of SiO$_2$ to Al$_2$O$_3$ at 500 to 700° C., preparing a suspension having a mass ratio of 5 to 15 in terms of liquid/solid from the above fired ultra-stable Y-type zeolite, adding an inorganic acid or an organic acid thereto so that a pH of the above suspension is 1.0 to 2.0, subsequently adding a zirconium compound and/or a hafnium compound and a titanium compound and mixing them and then neutralizing the mixed solution is used as the framework-substituted zeolite-1.

According to a third aspect of the present invention in accordance with the object described above, a method for hydrocracking hydrocarbon oil includes hydrocracking hydrocarbon oil with the hydrocracking catalyst described above.

Preferably, the method for hydrocracking hydrocarbon oil according to the third aspect of the present invention further includes filling a reactor vessel of a hydrocracking apparatus which is a flow reactor with the hydrocracking catalyst, and treating a hydrocarbon oil having a boiling point of 375° C. to 816° C. (707 to 1500° F.) in the presence of hydrogen at a reactor temperature of 300° C. to 500° C., a hydrogen pressure of 4 to 30 MPa, a liquid hourly space velocity (LHSV) of 0.1 to 10 h$^{-1}$, and a hydrogen/oil ratio of 500 to 2500 Nm$^3$/m$^3$.

Preferably, the method for hydrocracking hydrocarbon oil according to the third aspect of the present invention further includes filling a reactor vessel of a hydrocracking apparatus which is a flow reactor with the hydrocracking catalyst, and treating a hydrocarbon oil having a boiling point of 375° C. to 650° C. (707 to 1200° F.) in the presence of hydrogen at a reactor temperature of 330° C. to 450° C., a hydrogen pressure of 7 to 15 MPa, a liquid hourly space velocity (LHSV) of 0.2 to 1.5 h$^{-1}$, and a hydrogen/oil ratio of 1000 to 2000 Nm$^3$/m$^3$ to afford kerosene-gas oil.

In the method for hydrocracking hydrocarbon oil according to the present invention, the flow reactor described above is preferably a flow reactor selected from a stirring bath type reactor, a boiling bed type reactor, a baffle-equipped slurry bath type reactor, a fixed bed type reactor, a rotary tube type reactor and a slurry bed type reactor.

In the method for hydrocracking hydrocarbon oil according to the present invention, the hydrocarbon oil described above contains preferably refined oil obtained from (1) crude oil, (2) synthetic crude oil, (3) bitumen, (4) oil sand, (5) shell oil or (6) coal liquid.

In the method for hydrocracking hydrocarbon oil according to the present invention, the hydrocarbon oil described above contains refined oil obtained from crude oil, synthetic crude oil, bitumen, oil sand, shell oil or coal liquid, and the above refined oil is preferably any of a) vacuum gas oil (VGO), b) deasphalted oil (DAO) obtained from a solvent deasphalting process or demetalled oil, c) light coker gas oil or heavy coker gas oil obtained from a coker process, d)

cycle oil obtained from a fluid catalytic cracking (FCC) process or e) gas oil obtained from a visbraking process.

The hydrocracking catalyst for hydrocarbon oil according to the present invention is characterized by that in a hydrocracking catalyst for hydrocarbon oil comprising a hydrogenative metal component carried on a support containing an ultra-stable Y-type zeolite, the above ultra-stable Y-type zeolite is the framework-substituted zeolite-1 in which a part of aluminum atoms constituting a framework thereof is substituted with zirconium atoms and/or hafnium atoms.

Accordingly, the hydrocracking catalyst of the present invention makes it easy to diffuse heavy hydrocarbons such as VGO, DAO and the like into mesopores thereof as compared with conventional hydrocracking catalysts comprising a support of a zeolite on which titanium fine particles or zirconium fine particles are carried, and a cracking activity of hydrocarbon oil is enhanced to make it possible to obtain middle distillates at high yields.

Further, the hydrocracking catalyst of the present invention has a slightly low cracking activity of hydrocarbon oils as compared with those of conventional hydrocracking catalysts comprising a hydrogenative metal component carried on a support comprising a framework-substituted zeolite in which a part of aluminum atoms constituting a framework of a Y-type zeolite is substituted with titanium atoms, but an excessive cracking reaction of kerosene & gas oil is inhibited, so that middle distillates can be obtained at high yields. Also, the hydrocracking catalyst for hydrocarbon oil according to the present invention is increased the number of active sites and therefore is provided with a high hydrocracking activity.

DESCRIPTION OF THE PREFERRED EMBODIMENTS

Hydrocracking Catalyst for Hydrocarbon Oil

Figure 1:
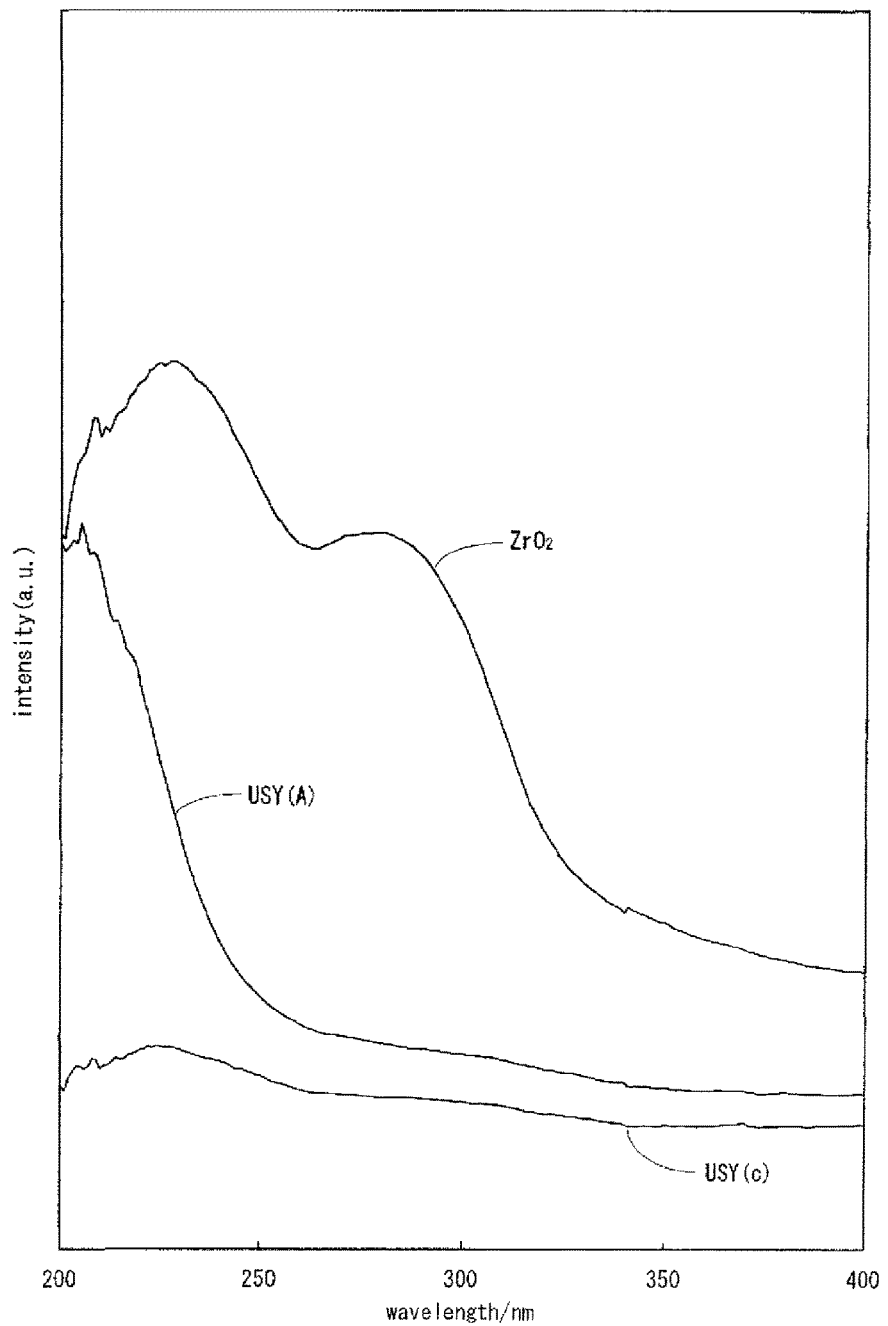
FIG. 1 is UV-vis-NIR spectra of USY (A), USY (c) and $ZrO_2$.

The hydrocracking catalyst for hydrocarbon oil according to the present invention comprises a hydrogenation-active metal component carried on a support containing a framework-substituted zeolite-1 that contains zirconium atoms and/or hafnium atoms partially constituting a framework of an ultra stable Y-type zeolite (hereinafter, also referred to as "USY"). In the present specification, "the hydrocracking catalyst for hydrocarbon oil according to the present invention" shall be referred to as "the hydrocracking catalyst according to the present invention", and "the method for producing a hydrocracking catalyst for hydrocarbon oil according to the present invention" shall be referred to as "the method for producing a hydrocracking catalyst according to the present invention".

The hydrocracking catalyst according to the present invention shall be explained below in details.

(1) Framework-Substituted Zeolite-1 (Constitution)

The framework-substituted zeolite-1 in the present invention is an ultra-stable Y-type zeolite in which silicon atoms and aluminum atoms form a zeolite framework and in which a part of the aluminum atoms is substituted with zirconium atoms and/or hafnium atoms (hereinafter, the framework-substituted zeolite-1 in which a part of aluminum atoms forming a zeolite framework is substituted only with zirconium atoms is referred to as a "zirconium-substituted zeolite" or "Zr-USY"; the framework-substituted zeolite-1 in which a part of aluminum atoms forming a zeolite framework of the framework-substituted zeolite-1 is substituted only with hafnium atoms is referred to as a "hafnium-substituted zeolite" or "Hf-USY"; and similarly, the framework-substituted zeolite-1 in which a part of aluminum atoms forming a zeolite framework is substituted only with zirconium atoms and hafnium atoms is referred to as a "zirconium•hafnium-substituted zeolite" or "Zr•Hf-USY"). Zirconium atoms and/or hafnium atoms which are substituted for the aluminum atoms forming a framework of the ultra-stable Y-type zeolite serve as constituents of the framework of the ultra stable Y-type zeolite. In this respect, "substitution" in the present invention differs from "carrying" in which zirconium atoms and/or hafnium atoms or particles thereof are attached to the outside of the framework of the ultra stable Y-type zeolite, and it differs as well from "combination" prescribed in claim 3 of the patent document 2 (Japanese Unexamined Patent Application Publication No. 2002-255537) described above. In the framework-substituted zeolite-1 according to the present invention, zirconium atoms and/or hafnium atoms may optionally be "carried" thereon or "combined" therewith, as prescribed in claim 3 of the patent document 2, in the form of, for example, an oxide.

The fact that substitution occurs can be verified by, for example, ultraviolet, visible, and near-infrared spectrophotometry (UV-Vis-NIR), Fourier transform infrared spectroscopy (FT-IR), or nuclear magnetic resonance spectrometry (NMR). Note that in the framework-substituted zeolite in which the framework of a β-zeolite is substituted by zirconium atoms, it is known that a UV spectrum indicating the presence of zirconium atoms is shown in the range of about 200 to about 220 nm (for example, see FIG. 3 in "B. Rakshe et al., Journal of Catalysis 188, 252, 1999").

In the framework-substituted zeolite-1 in the present invention, a part of aluminum atoms forming a zeolite framework thereof has to be substituted with (I) zirconium atoms, (II) hafnium atoms or (III) zirconia and hafnium atoms.

The framework-substituted zeolite-1 in the present invention preferably contains 0.1% to 5% and more preferably 0.2% to 4% zirconium atoms and/or hafnium atoms by mass in terms of oxide (i.e., "$ZrO_2$" and "$HfO_2$") based on the framework-substituted zeolite-1. Further, a range of 0.3 to 3% by mass is more preferably recommended.

In this regard, a content range (based on oxides) of zirconium atoms and/or hafnium atoms includes all of the contents of zirconium atoms and/or hafnium atoms substituted for aluminum atoms forming a zeolite framework and zirconium atoms and/or hafnium atoms which are not substituted for the above aluminum atoms.

A zirconium atom and/or hafnium atom content of the framework-substituted zeolite-1 of less than 0.1% by mass in terms of oxide based on a mass of the framework-substituted zeolite-1 does not result in an effective amount of a solid acid for a hydrocracking reactor when a hydrocracking catalyst prepared by using the above framework-substituted zeolite-1 as a support is applied to a hydrocracking reactor, and it is thus liable to cause a reduction in activity of a hydrocracking reactor of hydrocarbon oil.

Similarly, a zirconium atom and/or hafnium atom content exceeding 5% by mass in terms of oxide based on a mass of the =framework-substituted zeolite-1 does not result in an effective pore volume for a hydrocracking reactor of hydrocarbon oil, and it is thus liable to cause a reduction in activity of a hydrocracking reactor of hydrocarbon oil.

When the framework-substituted zeolite-1 in the present invention contains the zirconium atoms and the hafnium atoms described above, a mass ratio (in terms of oxides) of the zirconium atoms to the hafnium atoms shall not specifically be restricted.

The zirconium atom and/or hafnium atom content of the framework-substituted zeolite-1 can be measured with, for example, an X-ray fluorescence analyzer, a high frequency plasma emission spectrometer, an atomic absorption spectrometer or the like.

In the framework-substituted zeolite-1 described above, zirconium atoms and/or hafnium atoms may optionally be "carried" thereon or "combined" therewith as prescribed in claim 3 of the patent document 2 in the form of, for example, oxide. In this case, zirconium atoms may be, as described above, carried or combined in the form of zirconium oxide particles. Also, hafnium atoms may be, as described above, carried or combined in the form of hafnium oxide particles.

When the above particles are present, a particle diameter thereof is preferably 50 nm or less. A particle diameter of the zirconium particles and/or hafnium particles each described above exceeding 50 nm, in some cases, does not result in an effective pore volume for a hydrotreating reactor and is liable to cause clogging of pores. Thus, activity in hydrogenation and dehydrogenation with the hydrocracking catalyst including the zeolite described above tends to decrease. The particle diameters of the zirconium particles and the hafnium particles each described above can be measured from a photograph taken with a scanning electron microscope (SEM).

The framework-substituted zeolite-1 in the present invention may contain titanium atoms in addition to zirconium atoms and/or hafnium atoms, and the above titanium atoms are more preferably contained in such a manner that titanium atoms are partially substituted for a part of aluminum atoms forming the zeolite framework.

To be specific, titanium atoms are contained in the framework-substituted zeolite-1 described above in a proportion of preferably 0.1 to 5% by mass, more preferably 0.5 to 4% by mass in terms of oxide (that is, $TiO_2$) on a mass basis of the framework-substituted zeolite-1. Also, a proportion of 0.6 to 3% by mass is further preferably recommended.

In this regard, if a content of the above titanium atoms in the framework-substituted zeolite-1 is less than 0.1% by mass in terms of oxide, an amount of a solid acid which is effective for a hydrocracking reactor is not obtained when a hydrocracking catalyst prepared by using the above framework-substituted zeolite-1 as a support is applied to a hydrocracking reactor, and therefore an activity of hydrocarbon oil in a hydrocracking reactor tends to be reduced. Similarly, if a content of titanium atoms in the framework-substituted zeolite-1 exceeds 5% by mass in terms of oxide, a pore volume which is effective for a hydrocracking reactor is not obtained when a hydrocracking catalyst prepared by using the above framework-substituted zeolite-1 as a support is applied to a hydrocracking reactor, and therefore an activity of hydrocarbon oil in a hydrogenation reactor and a hydrocracking reactor tends to be reduced. A content of titanium atoms in the framework-substituted zeolite-1 can be measured by, for example, an X-ray fluorescence analyzer, a high frequency plasma emission spectrometer, an atomic absorption spectrometer or the like.

(2) Framework-Substituted Zeolite-2 (Constitution)

In the hydrocracking catalyst according to the present invention, a framework-substituted zeolite (hereinafter referred to as "a framework-substituted zeolite-2") in which a part of aluminum atoms forming the ultra-stable Y-type zeolite is substituted only with titanium atoms and/or an inorganic acid (limited to inorganic acids which do not correspond to those used in the framework-substituted zeolite-1) in addition to the framework-substituted zeolite-1 described above may be contained as a support. Titanium atoms which are not substituted for the above aluminum atoms may be contained in the framework-substituted zeolite-2 ("the framework-substituted zeolite-2" is referred to as "the titanium-substituted zeolite" or "Ti-USY").

The framework-substituted zeolite-2 can be prepared by, for example, a method described in WO2007/032232 (patent document 4).

The above framework-substituted zeolite-2 preferably contains 0.1% to 5% and more preferably 0.5% to 4% titanium atoms by mass on an oxide (i.e., "$TiO_2$") basis with respect to the framework-substituted zeolite-2. A content of 0.6 to 3% by mass is further preferably recommended.

A content range (based on oxide) of the above titanium atoms includes all of the contents of titanium atoms substituted for aluminum atoms forming a zeolite framework and titanium atoms which are not substituted for the above aluminum atoms.

In this regard, A titanium atom content of each of the framework-substituted zeolite-2 of less than 0.1% by mass on an oxide basis does not result in an effective amount of a solid acid for a hydrocracking reactor and is thus liable to cause a reduction in an activity of hydrocarbon oil in a hydrocracking reactor. The content exceeding 5% by mass does not result in an effective pore volume for a hydrocracking reactor and is thus liable to cause a reduction in an activity of hydrocarbon oil in a hydrogenation reactor and a hydrocracking reactor.

The titanium content of the framework-substituted zeolite-2 is measured with, for example, an X-ray fluorescence analyzer, a high frequency plasma emission spectrometer, an atomic absorption spectrophotometer or the like. In this regard, a crystal lattice constant, a specific surface area, a silica-alumina ratio, a crystallinity and a volume of pores having a pore diameter of 600 Å or less in the framework-substituted zeolite-2 are selected preferably from the same ranges as in the framework-substituted zeolite-1.

(3) Characteristics of Framework-Substituted Zeolite-1:

A crystal lattice constant, a specific surface area, a molar ratio of $SiO_2$ to $Al_2O_3$, that is, a silica-alumina ratio and the like in the framework-substituted zeolite-1 in the present invention fall preferably in predetermined ranges.

(a) Lattice Constant (UD)

The framework-substituted zeolites-1 in the present invention each have a crystal lattice constant of preferably 2.430 to 2.450 nm and more preferably 2.435 to 2.445 nm. A crystal lattice constant of a framework-substituted zeolite of less than 2.430 nm is liable to cause a reduction in the activity of the hydrocracking catalyst prepared by using the framework-substituted zeolite-1 as a support because of a high $SiO_2/Al_2O_3$ molar ratio in the framework structure of the zeolite and a small number of solid acid sites serving as active sites for the decomposition of hydrocarbons.

A crystal lattice constant of the framework-substituted zeolite-1 exceeding 2.450 nm results in breakage of the crystal structure of the framework-substituted zeolite-1 during a hydrocracking reactor because of a low heat resistance of the framework-substituted zeolite-1 and is thus liable to cause a reduction in the activity of the hydrocracking catalyst prepared by using the framework-substituted zeolite-1 as a support.

A crystal lattice constant of the framework-substituted zeolite-2 described above also is preferably 2.430 to 2.450 nm, more preferably 2.435 to 2.445 nm. A reason why the above crystal lattice constant range is preferred is the same as in a case of the framework-substituted zeolite-1.

Here, the crystal lattice constant can be measured by reference to an ASTM method: The angle of Kα at the (111) plane of titanium oxide (anatase) is determined using silicon (Si) serving as a primary reference material. X-ray diffraction peaks from the (533) and (642) planes of Y zeolite are measured using titanium oxide serving as a secondary reference material.

(b) Specific Surface Area (SA):

The framework-substituted zeolite-1 in the present invention preferably has a specific surface area of 600 to 900 m$^2$/g and more preferably 650 to 800 m$^2$/g. This specific surface area is a value determined by the BET method using nitrogen adsorption.

A specific surface area of the framework-substituted zeolite-1 of less than 600 m$^2$/g, in some cases, results in a reduction in the number of solid acid sites effective for a hydrotreating reactor, so that a catalyst activity of the hydrocracking catalyst prepared by using the above framework-substituted zeolite as a support is unsatisfactory. A framework-substituted zeolite having a specific surface area exceeding 900 m$^2$/g is difficult to produce.

The framework-substituted zeolite-2 also has preferably a specific surface area of 600 to 900 m$^2$/g, more preferably 650 to 800 m$^2$/g. A reason why the above specific surface area range is preferred is the same as in a case of the framework-substituted zeolite-1.

(c) Molar Ratio of $SiO_2$ to $Al_2O_3$ (Silica-Alumina Ratio):

The framework-substituted zeolite-1 in the present invention preferably has a molar ratio of $SiO_2$ to $Al_2O_3$ (silica-alumina ratio) of 20 to 100 and more preferably 25 to 80.

A silica-alumina ratio of the framework-substituted zeolite-1 of less than 20 does not result in an effective pore volume for a hydrotreating reactor and is thus liable to cause a reduction in activity in hydrogenation and hydrocracking reaction with the hydrocracking catalyst prepared by using the framework-substituted zeolite as a support.

A silica-alumina ratio of the framework-substituted zeolite-1 exceeding 100 is liable to cause a reduction in activity in a decomposition reactor with the hydrocracking catalyst prepared by using the framework-substituted zeolite because of a small number of solid acid sites effective for a hydrotreating reactor.

The framework-substituted zeolite-2 also has preferably a silica-alumina ratio of 20 to 100, more preferably 25 to 80. A reason why the above range of the silica-alumina ratio is preferred is the same as in a case of the framework-substituted zeolite-1.

(d) Crystallinity:

The framework-substituted zeolites-1 have a crystallinity of preferably 80% or more. A crystallinity of less than 80% does not provide a desired effect of a hydrocracking catalyst including the framework-substituted zeolite as a support. The framework-substituted zeolite-1 desirably has a crystallinity of 100% to 130%.

A crystallinity of the framework-substituted zeolite-2 tends to be the same as in a case of the framework-substituted zeolite-1.

In this regard, the crystallinity is determined as follows: The total height (H) of peaks from the (331), (511), (440), (533), (642), and (555) planes of a framework-substituted zeolite measured by X-ray diffraction is determined. The total height ($H_0$) of peaks from the same planes of a commercially available Y zeolite (SK-40, manufactured by Union Carbide Corporation) is determined as a reference. The crystallinity is determined using the following formula (1):

$$\text{Crystallinity (\%)} = H/H_0 \times 100 \qquad (1)$$

The framework-substituted zeolite-2 also has a crystallinity of preferably 80% or more. A reason why the above crystallinity range is preferred is the same as in a case of the framework-substituted zeolite-1.

(4) Method for Producing the Framework-Substituted Zeolite-1

The framework-substituted zeolite-1 in the present invention can be produced by, for example, a method described below.

The framework-substituted zeolite-1 is produced by firing an ultra stable Y-type zeolite at 500° C. to 700° C., the ultra stable Y-type zeolite having a crystal lattice constant of 2.430 to 2.450 nm, a specific surface area of 600 to 900 m$^2$/g, and a molar ratio of $SiO_2$ to $Al_2O_3$ of 20 to 100, forming a suspension containing the fired ultra stable Y-type zeolite, the suspension having a liquid/solid mass ratio of 5 to 15, adding an inorganic acid or an organic acid so that a pH of the above suspension is 1.0 to 2.0, subsequently adding a solution containing a zirconium compound and/or a hafnium compound and mixing them and neutralizing the solution with, for example, an aqueous ammonia in such a manner that the mixed solution has a pH of about 7. The above production method shall be described below in details.

a) Ultra-Stable Y-Type Zeolite:

Ultra stable Y-type zeolite is used as one of the raw materials for the framework-substituted zeolite-1 in the present invention. The ultra-stable Y-type zeolite is publicly known, and a production method therefor shall not specifically be restricted. The ultra-stable Y-type zeolite in the present invention means zeolite having a crystal lattice constant (UD) falling in a range of 2.430 nm or more and 2.450 nm or less, a specific surface area of 600 to 900 m$^2$/g and a molar ratio (silica-alumina ratio) falling in a range of 20 to 100 in terms of $SiO_2$ to $Al_2O_3$.

In a production method for the above ultra-stable Y-type zeolite, a Y-type zeolite (Na—Y) synthesized by a common method is subjected to exchange of sodium ions with ammonium ions by a conventional method (for example, dispersing Y-type zeolite in water to prepare a suspension, adding ammonium sulfate thereto, then washing the solid matter with water, next washing it with an ammonium sulfate aqueous solution of a temperature of 40 to 80° C., subsequently washing it with water of 40 to 95° C. and then drying it at 100 to 180° C. for 30 minutes to obtain an ammonium-exchanged Y-type zeolite ($NH_4$—$^{50\ to\ 70}Y$) in which 50 to 70% of Na contained in the Y-type zeolite is substituted with $NH_4$.

Subsequently, a hydrogen type Y-type zeolite (HY) is prepared by calcining the above ammonium-exchanged Y-type zeolite ($NH_4$—$^{50\ to\ 70}Y$) at 500 to 800° C. for 10 minutes to 10 hours in a saturated vapor atmosphere. Then, an ammonium-exchanged Y-type zeolite ($NH_4$—$^{80\ to\ 97}Y$) in which 80 to 97% of Na contained in the initial Y-type zeolite (Na—Y) is ion-exchanged with $NH_4$ can be obtained by dispersing the hydrogen type Y-type zeolite obtained above in water of 40 to 95° C. to prepare a suspension, further adding ammonium sulfate thereto, then stirring the suspension at 40 to 95° C. for 10 minutes to 3 hours, further washing the solid matter with water of 40 to 95° C., next washing it with an ammonium sulfate aqueous solution of 40 to 95° C., subsequently washing it with water of 40 to 80° C. and then drying it at 100 to 180° C. for 30 minutes to 30 hours. In this respect, the final ammonium ion exchange rate is preferably 90% or more.

The ammonium-exchanged Y zeolite ($NH_4$—$^{80\ to\ 97}Y$) thus obtained is calcined at 500 to 700° C. for 10 minutes to 10 hours in, for example, a saturated vapor atmosphere, whereby capable of being prepared is a ultra-stable Y-type zeolite (USY) having a crystal lattice constant (UD) of 2.430 nm or more and 2.450 nm or less, a specific surface area of 600 to 900 $m^2/g$ and a molar ratio (silica-alumina ratio) of $SiO_2$ to $Al_2O_3$ of 20 to 100.

It is important for obtaining the desired framework-substituted zeolite-1 to control a crystal lattice constant of the ultra-stable Y-type zeolite to 2.430 to 2.450 nm.

In the method for producing the hydrocracking catalyst according to the present invention, extraskeletal aluminum (aluminum atoms which do not form the zeolite framework) may be removed from the ultra-stable Y-type zeolite described above which is the raw material in order to obtain the ultra-stable Y-type zeolite having a crystal lattice constant of 2.430 to 2.450 nm. Extraskeletal aluminum can be removed by, for example, a method of dispersing the ultra-stable Y-type zeolite described above in warm water of 40 to 95° C. to prepare a suspension, adding sulfuric acid to the above suspension and stirring it for 10 minutes to 3 hours while maintaining the temperature at 40 to 95° C. to thereby dissolve the extraskeletal aluminum. An addition amount of sulfuric acid shall not specifically be restricted as long as it is an amount by which extraskeletal aluminum can be dissolved to a desired level. After dissolving the extraskeletal aluminum, the suspension is filtrated, and a residue on the filter is washed with purified water of 40 to 95° C. and dried at 100 to 180° C. for 3 to 30 hours, whereby an ultra-stable Y-type zeolite from which the extraskeletal aluminum is removed can be obtained.

In the method for producing the hydrocracking catalyst according to the present invention, the ultra-stable Y-type zeolite which is the raw material is calcined at 500° C. to 700° C., preferably 550° C. to 650° C. The calcining time shall not specifically be restricted as long as the targeted framework-substituted zeolite-1 is obtained, and it is calcined in a range of, for example, 30 minutes to 10 hours. If a calcining temperature of the ultra-stable Y-type zeolite is lower than 500° C., a framework substitution amount of zirconium atoms, hafnium atoms and titanium atoms tends to be reduced when carrying out framework substitution treatment by zirconium atoms, hafnium atoms or titanium atoms at a subsequent step as compared with a case in which calcining is carried out at 500° C. to 700° C. If the calcining temperature exceeds 700° C., a specific surface area of the ultra-stable Y-type zeolite is lowered, and a framework substitution amount of zirconium atoms, hafnium atoms and titanium atoms is reduced when carrying out framework substitution treatment by zirconium atoms, hafnium atoms or titanium atoms at a subsequent step, so that zirconium atoms, hafnium atoms and titanium atoms come to be present in a particular form. In respect to a calcining atmosphere of the ultra stable Y-type zeolite, it is carried out preferably in the air.

The calcined ultra-stable Y-type zeolite is suspended in water having a temperature of about 20° C. to about 30° C. to form a suspension. With respect to the concentration of the suspension of the ultra-stable Y-type zeolite, the liquid/solid mass ratio is preferably in the range of 5 to 15, and more preferably, a mass ratio of 8 to 12 is recommended.

Next, an inorganic acid or an organic acid is added thereto so that a pH of the suspension described above is controlled to 1.0 to 2.0, and subsequently a solution containing a zirconium compound and/or a hafnium compound is added and mixed. Then, the mixed solution is neutralized (pH 7.0 to 7.5) and dried desirably at 80 to 180° C., whereby the framework-substituted zeolite-1 described above can be obtained.

Sulfuric acid, nitric acid, hydrochloric acid and the like can be given as the above inorganic acid used, and among them, sulfuric acid, hydrochloric acid and the like are particularly preferred. Further, carboxylic acids can suitably be used as the organic acid described above. A use amount of the inorganic acid or the organic acid shall not be restricted as long as a pH of the suspension can be controlled to a range of 1.0 to 2.0, and it is, for example, a 0.5- to 4.0-fold molar amount and preferably 0.7- to 3.5-fold molar amount based on an amount of $Al_2O_3$ in the ultra-stable Y-type zeolite, but it shall not be restricted to the above range.

Examples of the zirconium compound described above include zirconium sulfate, zirconium nitrate, zirconium chloride and the like. Among these compounds, zirconium sulfate, zirconium nitrate, and the like are particularly preferred. The amount of the zirconium compound added is preferably 0.1% to 5% by mass and more preferably 0.2% to 4% by mass on a zirconium oxide basis with respect to the ultra-stable Y-type zeolite described above. The addition of the zirconium compound in an amount of less than 0.1% by mass fails to improve solid acid of the zeolite. The addition of the zirconium compound in an amount exceeding 5% by mass may cause clogging of pores of the zeolite. Usually, an aqueous solution of a zirconium compound prepared by dissolving the zirconium compound in water is suitably used as the zirconium compound.

Examples of the hafnium compound described above include hafnium chloride, hafnium nitrate, hafnium fluoride, hafnium bromide, hafnium oxalate and the like. Among these compounds, hafnium chloride, hafnium nitrate, and the like are particularly preferred. The amount of the hafnium compound added is preferably 0.1% to 5% by mass and more preferably 0.2% to 4% by mass on a hafnium oxide basis with respect to the ultra-stable Y-type zeolite. The addition of the hafnium compound in an amount of less than 0.1% by mass cannot improve a solid acid of the zeolite. The addition of the hafnium compound in an amount exceeding 4% by mass makes the resulting catalyst expensive. Usually, an aqueous solution of a hafnium compound prepared by dissolving the hafnium compound in water is suitably used as the hafnium compound.

Here, a titanium compound may be added to the mixed solution described above. Examples of the titanium compound include titanium sulfate, titanium acetate, titanium chloride, titanium nitrate, and titanium lactate. Among these compounds, titanium sulfate, titanium acetate, and the like are particularly preferred. The amount of the titanium compound added is preferably 0.1% to 5% by mass and more preferably 0.2% to 4% by mass on an oxide basis with respect to the ultra stable Y-type zeolite. The addition of the titanium compound in an amount of less than 0.1% by mass causes lack of solid acid sites of the zeolite. The addition of the titanium compound in an amount exceeding 5% by mass may cause clogging of pores of the zeolite. Usually, an aqueous solution of a titanium compound prepared by dissolving the titanium compound in water is suitably used as the titanium compound.

A pH of the above suspension has to be controlled in advance to 1.0 to 2.0 for the purpose of preventing precipitation from being generated in mixing an aqueous solution of the zirconium compound, the hafnium compound or the titanium compound with a suspension of the ultra-stable Y-type zeolite described above.

In the case of mixing an aqueous solution of the zirconium compound, the hafnium compound or the titanium compound with a suspension of the ultra-stable Y-type zeolite, preferably, the above aqueous solution is gradually added to the suspension. After finishing addition of the aqueous solution described above to the suspension, the solution is preferably mixed by stirring at, for example, room temperature (about 25° C. to about 35° C.) for 3 to 5 hours.

Further, after finishing the mixing described above, the mixed solution described above is neutralized by adding an alkali such as aqueous ammonia and the like so that a pH thereof is controlled to 7.0 to 7.5, whereby the framework-substituted zeolite-1 in the present invention can be obtained.

In this regard, when only the zirconium compound (or an aqueous solution thereof) is used as the compound (or an aqueous solution thereof) added to the suspension described above, the framework-substituted zeolite-1 (Zr-USY) in which zirconium atoms is substituted for a part of aluminum atoms forming the framework of the ultra-stable Y-type zeolite is formed; when only the hafnium compound (or an aqueous solution thereof) is used, the framework-substituted zeolite-1 (Hf-USY) in which hafnium atoms is substituted for a part of aluminum atoms forming the framework of the ultra stable Y-type zeolite is formed; and when the zirconium compound and the hafnium compound (or aqueous solutions thereof) are used, the framework-substituted zeolite-1 (Zr•Hf-USY) in which zirconium atoms and hafnium atoms are substituted for a part of aluminum atoms forming the framework of the ultra-stable Y-type zeolite is formed.

When the titanium compound (or an aqueous solution thereof) is added in combination in adding the zirconium compound and/or the hafnium compound (or aqueous solutions thereof) to the suspension described above, the framework-substituted zeolite-1 (Zr•Hf•Ti-USY) in which zirconium atoms, hafnium atoms and titanium atoms form a part of the framework of the ultra-stable Y-type zeolite is formed.

The resulting framework-substituted zeolite-1 is preferably filtered, if desired, washed with water, and dried at about 80° C. to about 180° C.

(5) Carrier:

In the hydrocracking catalyst according to the present invention, the support described above contains the framework-substituted zeolite-1 described above. The support described above can contain an inorganic oxide excluding the above framework-substituted zeolite-1 and/or the framework-substituted zeolite-2 in addition to the framework-substituted zeolite-1 described above.

The inorganic oxide described above typically contains a substance serving as a granulating agent or a binder. Usually, a known substance that is contained in a support including the ultra-stable Y-type zeolite and that is used as a granulating agent or the like can be used. As the inorganic oxide, a hydrocracking catalyst used in the related art and a porous inorganic oxide for use in hydrotreating catalysts can be used. Examples thereof include alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia. In the present invention, in particular, an inorganic oxide mainly composed of alumina, silica-alumina is preferred.

The framework-substituted zeolite-1 content and the inorganic oxide content of the support can be appropriately determined according to the object. The support has a framework-substituted zeolite-1 content of 2% to 80% by mass and preferably 20% to 70% by mass and an inorganic oxide content of 98% to 20% by mass and preferably 80% to 30% by mass. When the framework-substituted zeolite-1 and the framework-substituted zeolite-2 are used in combination, they are used preferably in a proportion of less than 50% in a sum of the framework-substituted zeolite-1 and the framework-substituted zeolite-2.

(6) Hydrogenative Metal Component:

As the hydrogenative metal component, a known metal component for use in conventional hydrocracking catalysts can be used. Examples thereof include metal components (iron, cobalt, nickel, rhodium, palladium, silver, iridium, platinum or gold) in group 8 of the long periodic table and/or metal components (chromium, molybdenum or tungsten) in group 6. Preferred examples of the metal component include combinations of molybdenum or tungsten in group 6 and cobalt or nickel in group 8; and metal components of the platinum group (platinum, rhodium, palladium and the like).

The hydrogenative metal component may be contained in the hydrocracking catalyst in an amount (0.01 to 40% by mass in terms of oxide) usually used in a hydrocracking catalyst used in the related art. In the case of molybdenum, tungsten, cobalt or nickel, an amount thereof is particularly preferably 3 to 30% by mass in terms of oxide based on a mass of the catalyst. In the case of the platinum group (platinum, rhodium, palladium and the like), an amount thereof is particularly preferably 0.01 to 2% by mass in terms of metal.

(7) Properties of Hydrocracking Catalyst for Hydrocarbon Oil:

A specific surface area of the hydrocracking catalyst according to the present invention falls preferably in a range of 200 to 450 m$^2$/g. Further, a range of 250 to 400 m$^2$/g is more suitably recommended. If the above specific surface area is less than 200 m$^2$/g, the decomposition rate is reduced, and a yield of the middle distillate is reduced as well. If the above specific surface area exceeds 450 m$^2$/g, the decomposition rate grows high, and the gas fraction tends to be increased.

In the hydrocracking catalyst according to the present invention, a volume of pores having a pore diameter of 600

Å or less falls preferably in a range of 0.40 to 0.75 ml/g. Further, the range of 0.45 to 0.70 ml/g is more suitably recommended. If the above pore volume is less than 0.40 ml/g, the specific surface area is reduced. Accordingly, the decomposition rate is reduced, and a yield of the middle distillate is reduced as well. If the above pore volume exceeds 0.75 ml/g, the specific surface area is elevated. Accordingly, the decomposition rate grows high, and the gas fraction tends to be increased. In this connection, the pore volume is determined from pore distribution obtained by calculating and analyzing a desorption data of nitrogen by a BJH method.

In the hydrocracking catalyst according to the present invention, the hydrogenation-active metal component is preferably carried thereon, as described above, in a range of 0.01 to 40% by mass.

An amount of zirconium or hafnium contained in the hydrocracking catalyst according to the present invention each is preferably 0.1 to 5% by mass (in terms of oxide) respectively. Further, the range of 0.5 to 4% is suitably recommended.

An amount of titanium optionally contained in the hydrocracking catalyst according to the present invention is preferably 0.1 to 5% by mass (in terms of oxide). Further, the range of 0.5 to 4% is suitably recommended.

Method for Producing Hydrocracking Catalyst for Hydrocarbon Oil:

The hydrocracking catalyst for hydrocarbon oil according to the present invention can be produced as follows: for example, the framework-substituted zeolite-1 is mixed with the inorganic oxide described above (or a precursor thereof). The mixture is formed into an article with a desired shape by a common method. The article is dried and fired to form a support. The support is impregnated with the hydrogenative metal component by a common method, dried, and fired, thereby affording the hydrocracking catalyst.

Alternatively, the framework-substituted zeolite-1 and the inorganic oxide (or a precursor thereof) are mixed with the hydrogenative metal component. The mixture is formed into an article with a desired shape. The article is dried and fired, thereby affording the hydrocracking catalyst.

The precursor of the inorganic oxide described above shows a substance to be formed into the inorganic oxide constituting a support of the hydrocracking catalyst by mixing with other catalyst constitutional components and subjecting to prescribed treatment.

Firing conditions for this type of catalyst used in the related art are applied to firing of the support and the hydrocracking catalyst. The firing temperature is preferably in the range of 400° C. to 650° C.

Usually, the hydrogenating catalyst according to the present invention can be prepared by impregnating the support described above with an aqueous solution containing the hydrogenation-active metal component and calcining it at 400 to 650° C., for example, for 10 minutes to 3 hours in the air.

Method for Hydrocracking Hydrocarbon Oil:

The hydrocracking catalyst for hydrocarbon oil according to the present invention is charged into a reactor vessel of a hydrotreating apparatus (flow reactor) and suitably used for hydrocracking hydrocarbon oil.

The hydrocarbon oil described above contains preferably refined oil obtained from (1) crude oil, (2) synthetic crude oil, (3) oil sand, (4) bitumen, (5) shell oil or (6) coal liquid. Suitably used as the above refined oil is oil selected from, for example, a) vacuum gas oil (VGO), b) deasphalted oil (DAO) obtained from a solvent deasphalting process or demetalled oil, c) light coker gas oil or heavy coker gas oil obtained from a coker process, d) cycle oil obtained from a fluid catalytic cracking (FCC) process or e) gas oil obtained from a visbraking process.

The hydrocracking can be carried out on publicly known conditions.

For example, a hydrotreating apparatus which is a flow reactor reactor apparatus is filled with the hydrocracking catalyst described above, and hydrocarbon oil having a boiling point of 375° C. to 833° C. can be treated in the presence of hydrogen on the conditions of a reaction temperature of 300° C. to 500° C., a hydrogen pressure of 4 to 30 MPa, a liquid hourly space velocity (LHSV) of 0.1 to 10 $h^{-1}$ and a hydrogen/oil ratio of 500 to 2500 $Nm^3/m^3$.

Further, a hydrotreating which is a flow reactor is filled with the hydrocracking catalyst described above, and a hydrocarbon oil having a boiling point of 375° C. to 650° C. can be treated in the presence of hydrogen on the conditions of a reactor temperature of 330° C. to 450° C., a hydrogen pressure of 7 to 15 MPa, a liquid hourly space velocity (LHSV) of 0.2 to 1.5 $h^{-1}$ and a hydrogen/oil ratio of 1000 to 2000 $Nm^3/m^3$ to obtain kerosene & gas oil. Capable of being suitably used as the flow reactor described above is a flow reactor selected from a stirring bath type reactor, a boiling floor type reactor, a baffle-equipped slurry bed type reactor, a fixed bed type reactor, a rotary tube type reactor and a slurry bed type reactor.

The hydrocracking catalyst for hydrocarbon oil according to the present invention can suitably be used particularly for hydrocracking of high boiling fraction-containing hydrocarbons. The high boiling fraction-containing hydrocarbons mean hydrocarbons in which an amount of fractions having a boiling point of 560° C. or higher accounts for 30% by mass or more. The high boiling fraction-containing hydrocarbons include, for example, a vacuum gas oil (VGO), a solvent deasphalted oil (DAO) and the like.

In the case where hydrocarbon oils, for example, high-boiling-fraction-containing hydrocarbons, are hydrocracked using the hydrocracking catalyst for hydrocarbon oil according to the present invention, middle distillates can be provided in high yield because of suppression of the excessive decomposition reactor of kerosene-gas oil, as described above.

Apparatus for Hydrotreating Hydrocarbon Oil:

An apparatus for hydrotreating hydrocarbon oil in the present invention is not particularly limited as long as the foregoing hydrocracking for hydrocarbon oil can be performed. Various types of apparatuses may be used. An apparatus for hydrotreating hydrocarbon oil including a first catalyst-filled tank, a second catalyst-filled tank, and a third catalyst-filled tank that are connected in series is particularly suitable. Each of the catalyst-filled tanks is filled with a hydrocracking catalyst for hydrocarbon oil.

The second catalyst-filled tank is filled with the hydrocracking catalyst according to the present invention. The hydrocracking catalyst in the second catalyst-filled tank is used in a filling factor of, for example, 10% to 60% by volume with respect to the total volume of all the hydrocracking catalysts filled into the first, second, and third catalyst-filled tanks. However, the filling factor may fall in a range other than the above range.

EXAMPLES

Analytical methods used in the present invention shall be described below.

1) Composition Analysis:

An X-ray fluorescence analyzer ("RIX3000" manufactured by Rigaku Corporation) was used to carry out composition analysis (Zr, Hf, Ti, Mo or Ni) of a sample (zeolite or the hydrocracking catalyst). A sample for measurement was prepared by a glass bead method. To be specific, 5 g of the sample was put in a vinyl chloride-made ring having an inner diameter of 35 mm and molded by applying a pressure of 20 t for 20 seconds by means of a pressure molding machine to prepare the sample for measurement. Conditions of the X-ray fluorescence analysis are shown below; target: Rh, analyzing crystal: LiF, detector: scintillation counter, excitation: Rh vessel of 4 kW, measuring voltage: 55 kV, current: 70 mA.

2) Measurement of Sodium in Zeolite:

An atomic absorption spectrometer ("Z5300" manufactured by HORIBA Ltd.) was used to measure a sodium content in a sample (zeolite). The measuring wavelength range was controlled to 190 to 900 nm.

3) Crystal Lattice Constant:

An X-ray diffractometer ("RINT2100" manufactured by Rigaku Corporation) was used to measure an X-ray diffraction peak of a sample (zeolite), and the crystal lattice constant was calculated from the result thereof. A method for calculating the crystal lattice constant has already been described in the present specification. Conditions of the X-ray diffraction are shown below; vessel: Cu—K (α ray), 2θ scanning range: 20 to 50°, scanning speed: 0.01°/minute, scanning step: 0.01°.

4) Crystallinity:

The crystallinity was calculated from an X-ray diffraction peak of a sample (zeolite). A calculating method therefor has already been described in the present specification.

5) $SiO_2/Al_2O_3$ Molar Ratio:

A peak intensity ratio of Si and Al was determined from an X-ray diffraction peak of a sample (zeolite), and it was reduced to a molar ratio of $SiO_2$ to $Al_2O_3$.

6) Specific Surface Area and Pore Volume:

An adsorption measuring equipment (fully automatic gas adsorption equipment "AUTOSORB-1" manufactured by Quantachrome Instruments Corporate) was used to subject 0.02 to 0.05 g of a sample (zeolite or the hydrocracking catalyst) to deaeration treatment at room temperature for 5 hours, and then an adsorption desorption isothermal curve was measured under liquid nitrogen temperature to calculate a specific surface area per mass using a BET equation of a multipoint method. Further, a pore distribution and a pore volume (pore diameter: 600 Å or less) were calculated from a nitrogen adsorption isothermal curve by a BJH method.

7) Ultraviolet-Visible/Near-Infrared/Spectrophotometry (UV-Vis-NIR Spectrum):

A UV-vis-NIR spectrum of zeolite was measured by means of an ultraviolet-visible/near-infrared/spectrophotometer (model number: JASCO V-570, manufactured by JASCO Corporation). The sample was prepared by physically mixing potassium bromide with the sample in a proportion of 99:1 and molding 50 mg of the mixture into a wafer form at a pressure of 500 kg/cm². Then, the molded matter was heated up to 200° C. at a heating rate of 3.0° C./minute and pre-treated by carrying out vacuum evacuation for 3 hours, and then measurement was carried out at room temperature on the conditions of a spectral bandwidth of 10 mm and a scanning speed of 400 nm/minute.

8) Fourier Transform Infrared Spectroscopy (FT-IR Spectrum):

FT-IR spectra of a hydroxyl group of zeolite and a framework vibration area thereof were measured by means of a transmission Fourier transform infrared spectroscope (JIR-7000, manufactured by JASCO Corporation). The sample was prepared by molding 20 mg of the sample into a wafer form at a pressure of 500 kg/cm². Thereafter, the molded matter was heated up to 400° C. at a heating rate of 6.7° C./minute and pre-treated by carrying out vacuum evacuation for 3 hours, and then measurement was carried out at room temperature on the conditions of a resolution of 4 cm' and an integration frequency of 500 times.

Explanations of Tables:

Table 1: the properties of USY (a) to (m) used as the raw materials were shown in Table 1.

Table 2: the properties of the framework-substituted zeolite-1 (USY (A) to USY (F)) used in Example 1 to Example 6 were shown in Table 2.

Table 3: the properties of the hydrocracking catalysts (Catalyst A to Catalyst F) prepared in Example 1 to Example 6 were shown in Table 3.

Table 4: the properties of the raw material oils used in the test examples were shown in Table 4.

Table 5: the test results (relative cracking rates and relative middle distillate yields) of the hydrocracking catalysts according to the present invention were shown in Table 5.

Example 1: Hydrocracking Catalyst A

Ultra-Stable Y Zeolite

First, 50.0 kg of a NaY zeolite (hereinafter, also referred to as "NaY") having a $SiO_2/Al_2O_3$ molar ratio of 5.2, a unit cell dimension (UD) of 2.466 nm, a specific surface area (SA) of 720 m²/g, and a $Na_2O$ content of 13.0% by mass was suspended in 500 liter (hereinafter, also expressed as "L") of water having a temperature of 60° C. Furthermore, 14.0 kg of ammonium sulfate was added thereto. The resulting suspension was stirred at 70° C. for 1 hour and filtered. The resulting solid was washed with water. Then the solid was washed with an ammonium sulfate solution of 14.0 kg of ammonium sulfate dissolved in 500 L of water having a temperature of 60° C., washed with 500 L of water having a temperature of 60° C., dried at 130° C. for 20 hours, thereby affording about 45 kg of a Y zeolite ($NH_4^{65}Y$) in which 65% of sodium (Na) contained in NaY was ion-exchanged with ammonium ion ($NH_4^+$). A content of $Na_2O$ in $NH_4^{65}Y$ was 4.5% by mass.

$NH_4^{65}Y$ 40 kg was fired in a saturated water vapor atmosphere at 670° C. for 1 hour to form a hydrogen-Y zeolite (HY). HY was suspended in 400 L of water having a temperature of 60° C. Then 49.0 kg of ammonium sulfate was added thereto. The resulting mixture was stirred at 90° C. for 1 hour and washed with 200 L of water having a temperature of 60° C. The mixture was then dried at 130° C. for 20 hours, thereby affording about 37 kg of a Y zeolite ($NH_4^{95}Y$) in which 95% of Na contained in the initial NaY was ion-exchanged with $NH_4$. $NH_4^{95}Y$ 33.0 kg was fired in a saturated water vapor atmosphere at 650° C. for 1 hour, thereby affording about 15 kg of a ultra stable Y zeolite (hereinafter, also referred to as "USY (a)") having a $SiO_2/Al_2O_3$ molar ratio of 5.2 and a $Na_2O$ content of 0.60% by mass. Table 1 shows physical properties of USY (a).

Next, 26.0 kg of this USY (a) was suspended in 260 L of water having a temperature of 60° C. After 61.0 kg of 25% sulfuric acid by mass was gradually added to the suspension, the suspension was stirred at 70° C. for 1 hour. The suspension was filtered. The resulting solid was washed with 260 liter of deionized water having a temperature of 60° C. and dried at 130° C. for 20 hours, thereby affording a ultra stable Y-type zeolite (hereinafter, also referred to as "USY (b)"). Table 1 shows physical properties of USY (b).

USY (b) was fired at 600° C. for 1 hour, thereby affording about 17 kg of ultra stable Y-type zeolite (hereinafter, also referred to as "USY (c)"). Table 1 shows physical properties of USY (c).

Preparation of Zirconium-Substituted Zeolite: USY (A)

First, 1 kg of USY (c) was suspended in 10 L of water having a temperature of 25° C. The pH of the suspension was adjusted to 1.6 with 25% sulfuric acid by mass. Then 86 g of a solution containing 18% zirconium sulfate by mass was added thereto. The resulting mixture was stirred for 3 hours at room temperature. Then the pH was adjusted to 7.2 with 15% aqueous ammonia by mass. After the mixture was stirred for 1 hour at room temperature, the mixture was filtered. The resulting solid was washed with 10 L of water and dried at 130° C. for 20 hours, thereby affording about 1 kg of a zirconium-substituted zeolite (hereinafter, also referred to as "USY (A)"). Table 2 shows physical properties of USY (A). FIG. 1 shows a UV spectrum of USY (A).

FIG. 1 demonstrated as follows: The UV spectrum of $ZrO_2$ derived from zirconium sulfate serving as a raw material for USY (A) showed peaks at about 230 and about 280 nm, whereas the UV spectrum of USY (A) showed a peak at about 200 to 220 nm. Thus, the framework of USY (A) was substituted by Zr.

Here, the UV spectrum of the zeolite was measured with an ultraviolet-visible-near-infrared spectrophotometer (JASCO V-570, manufactured by JASCO Corporation) at a band width of 10 mm and a scanning rate of 400 nm/min. Meanwhile, 50 mg of a potassium bromide-USY (A) 99:1 mixture was formed into a wafer-like UV-spectrum sample at a pressure of 500 kg/cm². The sample was placed in the ultraviolet-visible-near-infrared spectrophotometer. After pretreatment was performed by heating the sample to 200° C. at a heating rate of 3° C./min and evacuating the sample for 3 hours, measurement was performed at room temperature at a resolution of 4 cm$^{-1}$ and a number of integrations of 500.

The composition analysis of the zeolite was performed with an X-ray fluorescence analyzer (RIX 3000, manufactured by Rigaku Corporation). A sample was prepared by a glass bead method. Sodium in the zeolite was measured with an atomic absorption spectrophotometer (Z-5300, manufactured by HORIBA, Ltd). The crystallinity and the crystal lattice constant were measured with an X-ray diffractometer (RINT 2100, manufactured by Rigaku Corporation). The specific surface area and the pore volume were measured with a pore distribution analyzer (Autosorb, manufactured by Quantachrome Instruments).

Hydrocracking Catalyst A

First, 40 kg of an aqueous solution of 6.8% sodium aluminate by mass on an $Al_2O_3$ basis was mixed with 40 kg of an aqueous solution of 2.4% aluminum sulfate by mass on an $Al_2O_3$ basis. Further, the mixture was stirred at 60° C. for 1 hour, and then the product was washed with 150 L of a 0.3 mass % ammonia aqueous solution to remove $Na_2SO_4$. Next, water was added to the product from which $Na_2SO_4$ was removed to adjust an $Al_2O_3$ concentration to 10% by mass. The pH was adjusted to 10.5 with 15% aqueous ammonia by mass. The mixture was stirred at 95° C. for 10 hours, dehydrated, washed, and kneaded with a kneader, thereby providing an alumina mixture.

The resulting alumina mixture was mixed with USY (A) in a dry mass ratio of 1:1. The mixture was kneaded with a kneader, formed into a columnar shape having a diameter of 1.8 mm, and fired at 550° C. for 3 hours, thereby affording support A.

The support A was immersed in an aqueous solution containing hydrogenation-active metal components and fired in the air at 550° C. for 1 hour, thereby affording hydrocracking catalyst A. Here, the aqueous solution containing hydrogenation-active metal components was prepared by adding 700 mL of water to 201.3 g of molybdenum trioxide (an example of the hydrogenation-active metal component) and 90.4 g of nickel carbonate (an example of the hydrogenation-active metal component) and stirring the resulting mixture at 95° C. for 5 hours. Hydrocracking catalyst A contained 0.39% zirconium by mass, 16.7% molybdenum by mass, and 3.88% nickel by mass on an oxide basis. Table 3 shows physical properties of hydrocracking catalyst A.

Example 2: Hydrocracking Catalyst B

USY (c) 1 kg obtained in Example 1 was suspended in 10 L of water of 25° C., and a pH of the solution was adjusted to 1.6 by sulfuric acid of 25% by mass. Hafnium chloride 8 g was added and mixed, and the suspension was stirred at room temperature for 3 hours. Then, the pH was adjusted to 7.0 to 7.5 by aqueous ammonia of 15% by mass, and the suspension was stirred at room temperature for 1 hour and then filtrated. A matter obtained was washed with 10 L of water and dried at 130° C. for 20 hours to obtain about 1 kg of a hafnium-substituted type zeolite (hereinafter referred to as "USY (B)"). The properties thereof are shown in Table 2.

Further, a hydrocracking catalyst B containing USY (B) was prepared in the same manner as in Example 1. The properties of the hydrocracking catalyst B are shown in Table 3.

Example 3: Hydrocracking Catalyst C

USY (c) 1 kg obtained in Example 1 was suspended in 10 L of water of 25° C., and a pH of the solution was adjusted to 1.5 to 1.7 by sulfuric acid of 25% by mass. Zirconium sulfate of 18% by mass 86 g and hafnium chloride 8 g were added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium•hafnium-substituted type zeolite (hereinafter referred to as "USY (C)"). The properties thereof are shown in Table 2.

Further, a hydrocracking catalyst C containing USY (C) was prepared in the same manner as in Example 1. The properties of the hydrocracking catalyst C are shown in Table 3.

Example 4: Hydrocracking Catalyst D

USY (c) 1 kg obtained in Example 1 was suspended in 10 L of water of 25° C., and a pH of the solution was adjusted to 1.6 by sulfuric acid of 25% by mass. Zirconium sulfate of 18% by mass 86 g, hafnium chloride 8 g and titanyl sulfate of 33% by mass 60 g were added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium•hafnium•titanium-substituted type zeolite (hereinafter referred to as "USY (D)"). The properties of USY (D) are shown in Table 2, and a UV spectrum thereof is shown in FIG. 2.

Figure 2:
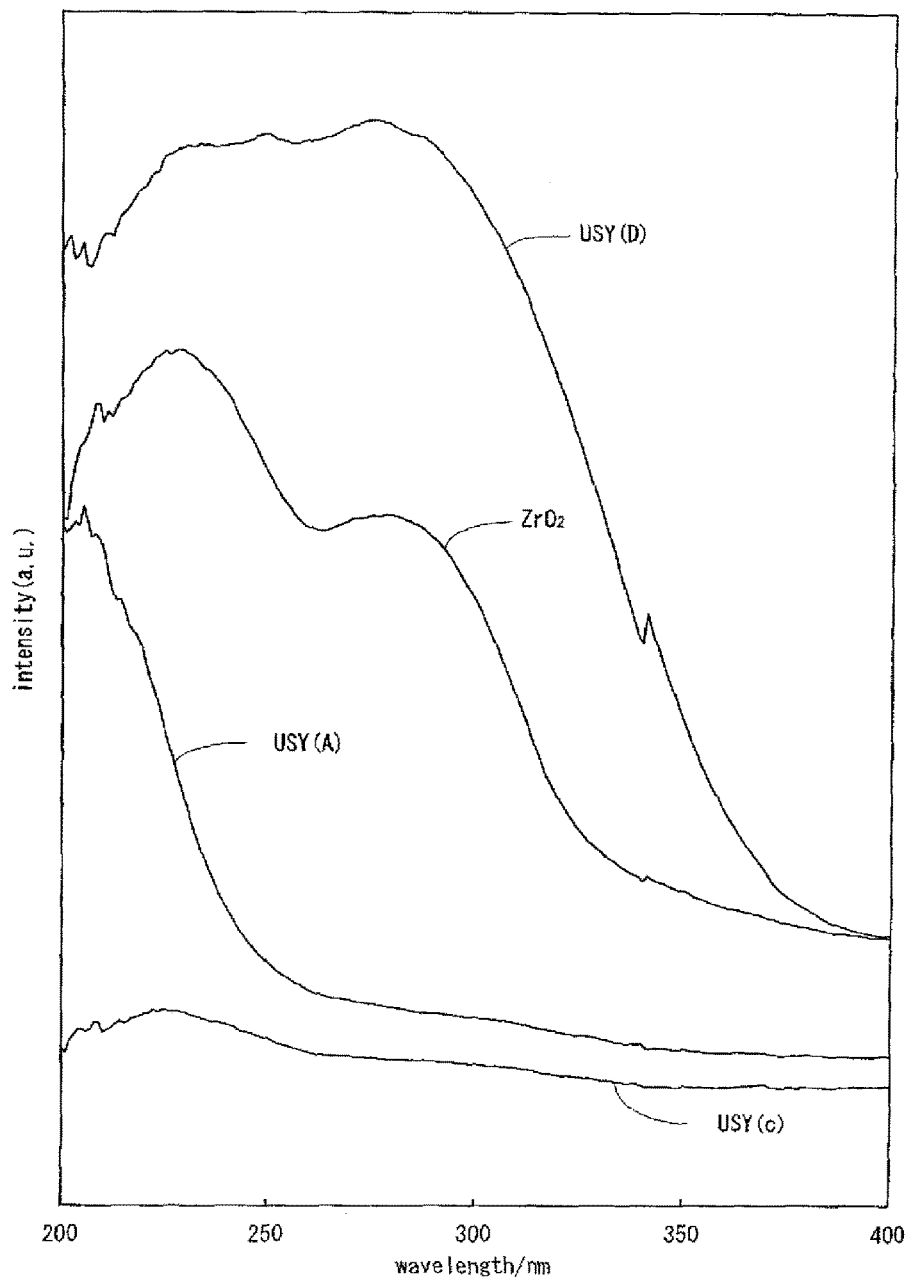
FIG. 2 is UV-vis-NIR spectra of USY (A), USY (D) and $ZrO_2$.

As shown in FIG. 2, it was confirmed that a UV spectrum of $TiO_2$ obtained from titanyl sulfate which was the raw material had peaks in the vicinity of 220 and 320 nm and that USY (D) had peaks in the vicinity of 210 to 320 nm due to substitution of Zr and Ti.

Further, a hydrocracking catalyst D containing USY (D) was prepared in the same manner as in Example 1. The properties of the hydrocracking catalyst D are shown in Table 3.

Example 5: Hydrocracking Catalyst E

USY (c) 1 kg obtained in Example 1 was suspended in 10 L of water of 25° C., and a pH of the solution was adjusted to 1.6 by sulfuric acid of 25% by mass. Zirconium sulfate of 18% by mass 86 g and titanyl sulfate of 33% by mass 60 g were added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium•titanium-substituted type zeolite (hereinafter referred to as "USY (E)"). The properties of USY (E) are shown in Table 2.

Further, a hydrocracking catalyst E containing USY (E) was prepared in the same manner as in Example 1. The properties of the hydrocracking catalyst E are shown in Table 3.

Example 6: Hydrocracking Catalyst F

USY (c) 1 kg obtained in Example 1 was suspended in 10 L of water of 25° C., and a pH of the solution was adjusted to 1.6 by sulfuric acid of 25% by mass. Hafnium chloride 8 g and titanyl sulfate of 33% by mass 60 g were added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a hafnium•titanium-substituted type zeolite (hereinafter referred to as "USY (F)"). The properties of USY (F) are shown in Table 2.

Further, a hydrocracking catalyst F containing USY (F) was prepared in the same manner as in Example 1. The properties of the hydrocracking catalyst F are shown in Table 3.

Comparative Example 1: Hydrocracking Catalyst G

USY (c) 1 kg obtained in Example 1 was suspended in 10 L of water of 25° C., and a pH of the solution was adjusted to 1.6 by sulfuric acid of 25% by mass. Titanyl sulfate of 33% by mass 60 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a titanium-substituted type zeolite (hereinafter referred to as "USY (G)"). The properties of USY (G) are shown in Table 2.

Further, a hydrocracking catalyst G containing USY (G) was prepared in the same manner as in Example 1. The properties of the hydrocracking catalyst G are shown in Table 3.

Comparative Example 2: Hydrocracking Catalyst H

Figure 3:
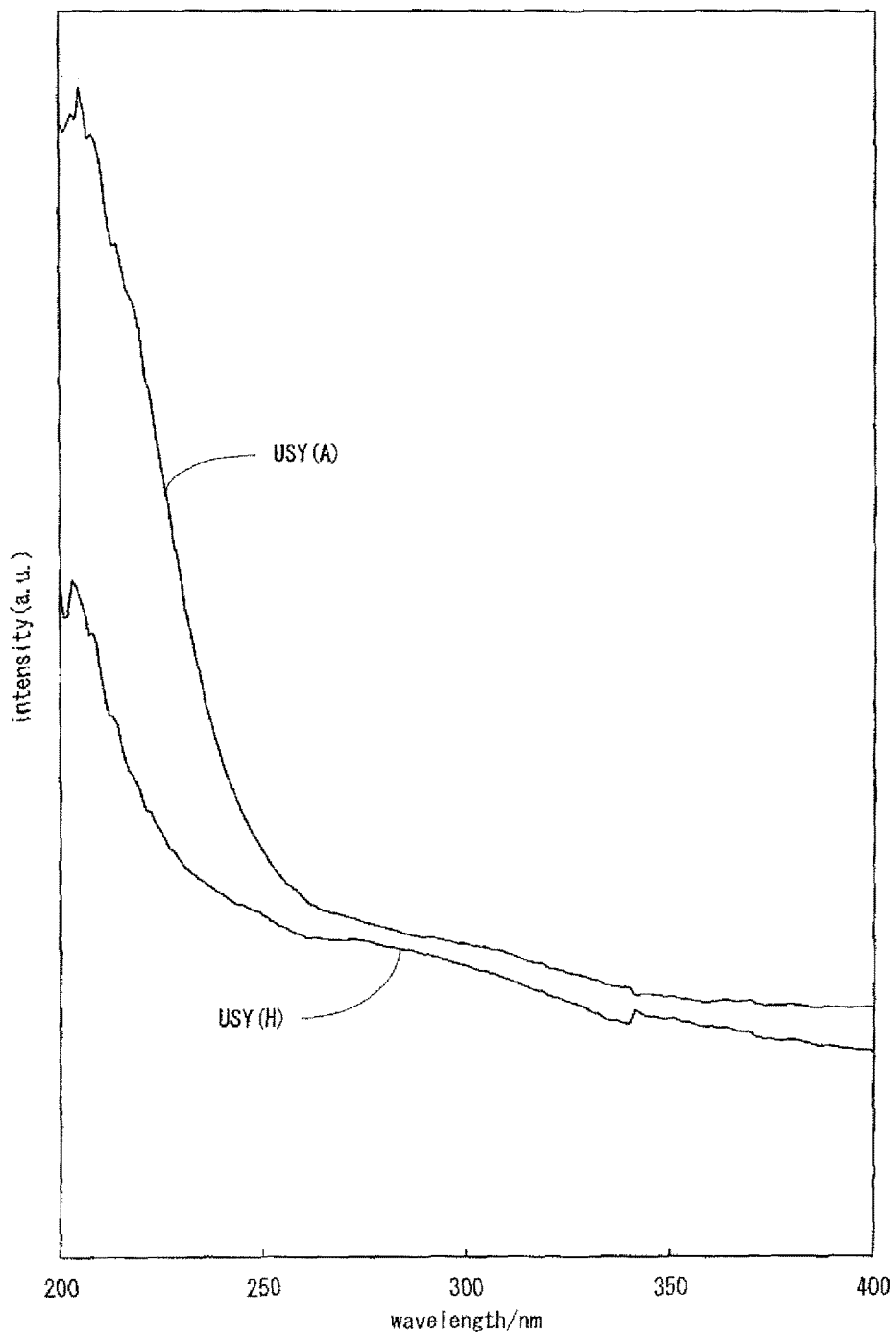
FIG. 3 is UV-vis-NIR spectra of USY (A) and USY (H). In all of USY (A), USY (H) and USY (D), peaks are observed in the vicinity of a wavelength of 208 nm as is the case with $ZrO_2$. USY (c) is a spectrum of an ultra-stable Y-type zeolite which is a raw material for USY (A), USY (G) and USY (E).
Figure 4:
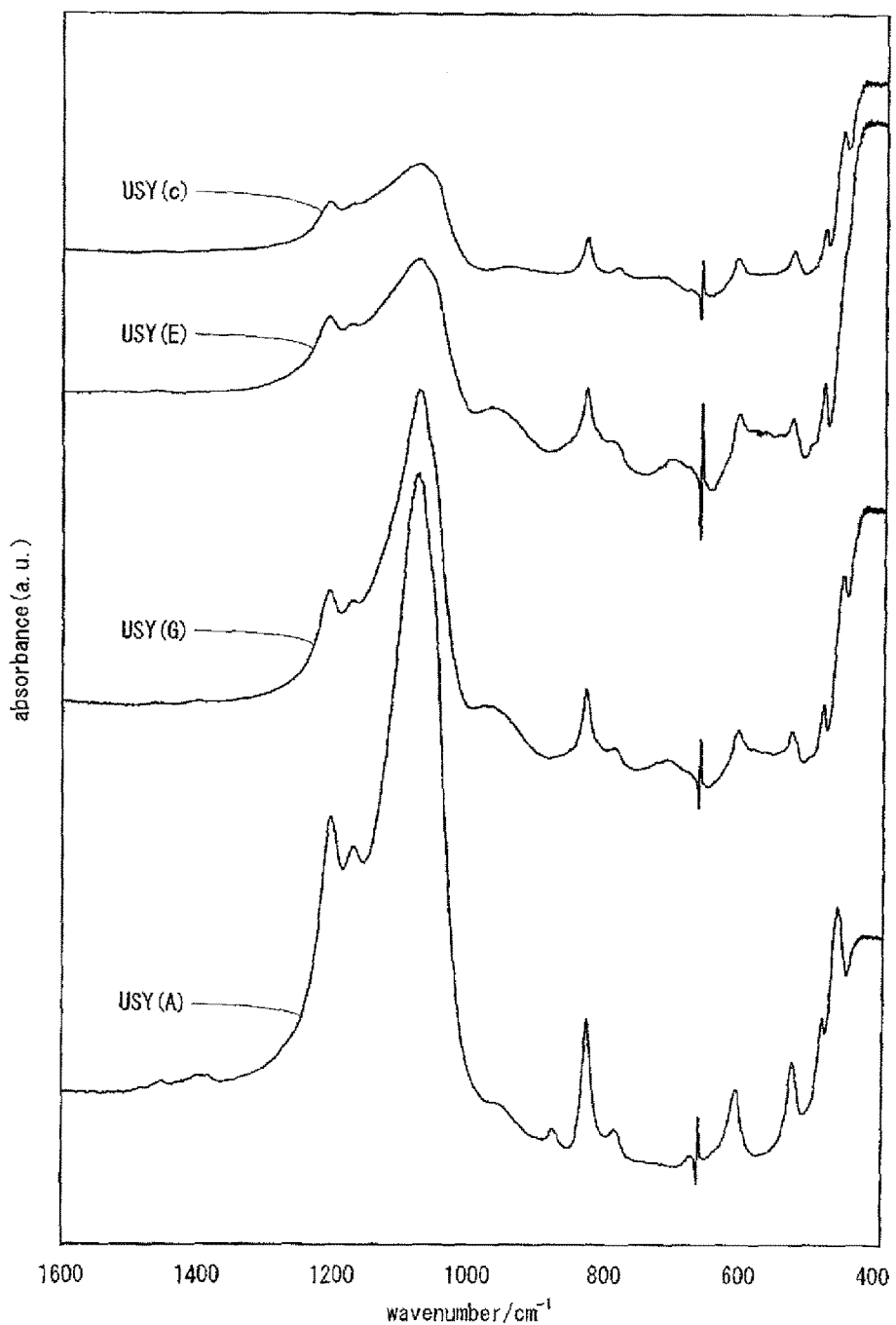
FIG. 4 is FT-IR spectra of USY (A), USY (G), USY (E) and USY (c). USY (A): a peak based on Si—O—Zr is observed in the vicinity of a wavelength of 960 $cm^{-1}$. This shows that USY (A) is a framework-substituted zeolite in which a part of Al atoms constituting a zeolite framework of USY (A) is substituted with Zr atoms. USY (G): a peak based on Si—O—Ti is observed in the vicinity of a wavelength of 960 $cm^{-1}$. This shows that USY (G) is a framework-substituted zeolite in which a part of Al atoms constituting a zeolite framework of USY (A) is substituted with Ti atoms. USY (E): peaks based on Si—O—Zr and Si—O—Ti are observed in the vicinity of a wavelength of 960 $cm^{-1}$. This shows that USY (E) is a framework-substituted zeolite in which a part of Al atoms constituting a zeolite framework of USY (A) is replaced with Zr atoms and/or Ti atoms. USY (c): USY (c) is an ultra-stable Y-type zeolite which is a raw material for USY (A), USY (G) and USY (E).

USY (b) 1 kg before calcining obtained in Example 1 was suspended in 10 L of water of 25° C., and a pH of the solution was adjusted to 1.6 by sulfuric acid of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (H)"). The properties of USY (H) are shown in Table 2, and a UV spectrum of USY (H) is shown in FIG. 3. In FIG. 3, it was observed from comparison of the UV spectra of USY (H) and USY (A) that substitution with zirconium was accelerated by calcining.

Further, a hydrocracking catalyst H containing USY (H) was prepared in the same manner as in Example 1. The properties of the hydrocracking catalyst H are shown in Table 3.

Comparative Example 3: Hydrocracking Catalyst I

An ultra stable Y-type zeolite (hereinafter referred to as "USY (d)") 1 kg prepared by calcining USY (b) obtained in Example 1 at 400° C. for one hour was suspended in 10 L of water of 25° C., and a pH of the solution was adjusted to 1.6 by sulfuric acid of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (I)"). In this regard, the properties of USY (d) are shown in Table 1; the properties of USY (I) are shown in Table 2; and a UV spectrum of USY (I) is shown in FIG. 3.

In FIG. 3, it was found from comparison of the UV spectra of USY (I) and USY (A) that substitution with zirconium was not accelerated by calcining at 400° C.

Further, a hydrocracking catalyst I containing USY (I) was prepared in the same manner as in Example 1. The properties of the hydrocracking catalyst I are shown in Table 3.

Comparative Example 4: Hydrocracking Catalyst J

An ultra stable Y-type zeolite (hereinafter referred to as "USY (e)") 1 kg prepared by calcining USY (b) obtained in Example 1 at 800° C. for one hour was suspended in 10 L of water of 25° C., and a pH of the solution was adjusted to 1.6 by sulfuric acid of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (J)"). The properties of USY (e) are shown in Table 1; the properties of USY (J) are shown in Table 2; and a UV spectrum of USY (J) is shown in FIG. 3.

Further, a hydrocracking catalyst J containing USY (J) was prepared in the same manner as in Example 1. The properties of the hydrocracking catalyst J are shown in Table 3.

Comparative Example 5: Hydrocracking Catalyst K

USY (c) 1 kg obtained in Example 1 was suspended in 10 L of water of 25° C., and a pH of the solution was adjusted to 0.6 by sulfuric acid of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the solution was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (K)"). The properties of USY (K) are shown in Table 2.

Further, a hydrocracking catalyst K containing USY (K) was prepared in the same manner as in Example 1. The properties of the hydrocracking catalyst K are shown in Table 3.

Comparative Example 6: Hydrocracking Catalyst L

USY (c) 1 kg obtained in Example 1 was suspended in 10 L of water of 25° C., and a pH of the solution was adjusted to 2.4 by sulfuric acid of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (L)"). The properties of USY (L) are shown in Table 2.

Further, a hydrocracking catalyst L containing USY (L) was prepared in the same manner as in Example 1. The properties of the hydrocracking catalyst L are shown in Table 3.

Comparative Example 7: Hydrocracking Catalyst M

USY (a) 2 kg obtained in Example 1 was suspended in 20 L of warm water of 60° C. Sulfuric acid of 25 mass % 3.7 kg was gradually added to the above suspension and then stirred at 70° C. for one hour to dissolve extraskeletal aluminum. Then, the suspension was filtrated, and a matter obtained was washed with 20 liter of purified water of 60° C. and dried at 130° C. for 20 hours to obtain an ultra stable Y-type zeolite (hereinafter referred to as "USY (f)"). The properties of USY (f) are shown in Table 1.

USY (f) thus obtained was calcined at 600° C. for 1 hour to obtain about 1.5 kg of an ultra stable Y-type zeolite (hereinafter referred to as "USY (g)"). The properties of USY (g) are shown in Table 1.

USY (g) 1 kg thus obtained was suspended in 10 L of water of 25° C., and a pH of the solution was adjusted to 1.6 by sulfuric acid of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (M)"). The properties of USY (M) are shown in Table 2.

Further, a hydrocracking catalyst M containing USY (M) was prepared in the same manner as in Example 1. The properties of the hydrocracking catalyst M are shown in Table 3.

Comparative Example 8: Hydrocracking Catalyst N

USY (a) 2 kg obtained in Example 1 was suspended in 20 L of warm water of 60° C. Sulfuric acid of 25 mass % 13.6 kg was gradually added to the above suspension and then stirred at 70° C. for one hour to dissolve extraskeletal aluminum. Then, the suspension was filtrated, and a matter obtained was washed with 20 liter of water of 60° C. and dried at 130° C. for 20 hours to obtain an ultra stable Y-type zeolite (hereinafter referred to as "USY (h)"). The properties of USY (h) are shown in Table 1.

USY (h) thus obtained was calcined at 600° C. for 1 hour to obtain about 11 kg of an ultra stable Y-type zeolite (hereinafter referred to as "USY (i)"). The properties of USY (i) are shown in Table 1.

USY (i) 1 kg thus obtained was suspended in 10 L of water of 25° C., and a pH of the solution was adjusted to 1.6 by sulfuric acid of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (N)"). The properties of USY (N) are shown in Table 2.

Further, a hydrocracking catalyst N containing USY (N) was prepared in the same manner as in Example 1. The properties of the hydrocracking catalyst N are shown in Table 3.

Comparative Example 9: Hydrocracking Catalyst O $NH_4^{95}Y$ 2 kg obtained in Example 1 was calcined at 800° C. for one hour in a saturated water vapor atmosphere to obtain about 15 kg of an ultra stable Y-type zeolite (hereinafter referred to as "USY (j)") having a UD of 2.425 nm. The properties of USY (j) are shown in Table 1.

USY (j) 1 kg thus obtained was calcined at 600° C. for 1 hour to obtain 1.5 kg of an ultra stable Y-type zeolite (hereinafter referred to as "USY (k)"). The properties of USY (k) are shown in Table 1.

USY (k) 1 kg thus obtained was suspended in 10 L of water of 25° C., and a pH of the solution was adjusted to 1.6 by a sulfuric acid aqueous solution of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (O)"). The properties of USY (O) are shown in Table 2.

Further, a hydrocracking catalyst O containing USY (O) was prepared in the same manner as in Example 1. The properties of the hydrocracking catalyst O are shown in Table 3.

Comparative Example 10: Hydrocracking Catalyst P $NH_4^{95}Y$ 2 kg obtained in Example 1 was calcined at 800° C. for one hour in a saturated water vapor atmosphere to obtain an ultra stable Y-type zeolite (hereinafter referred to as "USY (l)") having a UD of 2.455 nm. The properties of USY (l) are shown in Table 1.

USY (l) thus obtained was calcined at 600° C. for 1 hour to obtain about 1.5 kg of an ultra stable Y-type zeolite (hereinafter referred to as "USY (m)"). The properties of USY (m) are shown in Table 1.

USY (m) 1 kg thus obtained was suspended in 10 L of water of 25° C., and a pH of the solution was adjusted to 1.6 by a sulfuric acid aqueous solution of 25% by mass. Zirconium sulfate of 18% by mass 86 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (P)"). The properties of USY (P) are shown in Table 2.

Further, a hydrocracking catalyst P containing USY (P) was prepared in the same manner as in Example 1. The properties of the hydrocracking catalyst P are shown in Table 3.

Comparative Example 11: Hydrocracking Catalyst Q

USY (c) 1 kg obtained in Example 1 was suspended in 10 L of water of 25° C., and a pH of the solution was adjusted to 1.6 by a sulfuric acid aqueous solution of 25% by mass. Zirconium sulfate of 18% by mass 8.6 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (Q)"). The properties of USY (Q) are shown in Table 2.

Further, a hydrocracking catalyst Q containing USY (Q) was prepared in the same manner as in Example 1. The properties of the hydrocracking catalyst Q are shown in Table 3.

Comparative Example 12: Hydrocracking Catalyst R

USY (c) 1 kg obtained in Example 1 was suspended in 10 L of water of 25° C., and a pH of the solution was adjusted to 1.6 by a sulfuric acid aqueous solution of 25% by mass. Zirconium sulfate of 18% by mass 516 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium-substituted type zeolite (hereinafter referred to as "USY (Q)"). The properties of USY (Q) are shown in Table 2.

Further, a hydrocracking catalyst Q containing USY (Q) was prepared in the same manner as in Example 1. The properties of the hydrocracking catalyst Q are shown in Table 3.

Comparative Example 13: Hydrocracking Catalyst S

USY (c) 1 kg obtained in Example 1 was suspended in 10 L of water of 25° C., and a pH of the solution was adjusted to 1.6 by a sulfuric acid aqueous solution of 25% by mass. Hafnium chloride 1.6 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a hafnium-substituted type zeolite (hereinafter referred to as "USY (S)"). The properties of USY (S) are shown in Table 2.

Further, a hydrocracking catalyst S containing USY (S) was prepared in the same manner as in Example 1. The properties of the hydrocracking catalyst S are shown in Table 3.

Comparative Example 14: Hydrocracking Catalyst T

USY (c) 1 kg obtained in Example 1 was suspended in 10 L of water of 25° C., and a pH of the solution was adjusted to 1.6 by a sulfuric acid aqueous solution of 25% by mass. Hafnium chloride 96 g was added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a hafnium-substituted type zeolite (hereinafter referred to as "USY (T)"). The properties of USY (T) are shown in Table 2.

Further, a hydrocracking catalyst T containing USY (T) was prepared in the same manner as in Example 1. The properties of the hydrocracking catalyst T are shown in Table 3.

Comparative Example 15: Hydrocracking Catalyst U

USY (c) 1 kg obtained in Example 1 was suspended in 10 L of water of 25° C., and a pH of the solution was adjusted to 1.6 by a sulfuric acid aqueous solution of 25% by mass. Zirconium sulfate of 18% by mass 86 g and titanyl sulfate of 33% by mass 6.0 g were added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium•titanium-substituted type zeolite (hereinafter referred to as "USY (U)"). The properties of USY (U) are shown in Table 2.

Further, a hydrocracking catalyst U containing USY (U) was prepared in the same manner as in Example 1. The properties of the hydrocracking catalyst U are shown in Table 3.

Comparative Example 16: Hydrocracking Catalyst V

USY (c) 1 kg obtained in Example 1 was suspended in 10 L of water of 25° C., and a pH of the solution was adjusted to 1.6 by a sulfuric acid aqueous solution of 25% by mass. Zirconium sulfate of 18% by mass 86 g and titanyl sulfate of 33% by mass 516 g were added and mixed, and the suspension was stirred at room temperature for 3 hours. Then, the pH was adjusted to 7.2 by aqueous ammonia of 15% by mass, and the suspension was stirred at room temperature for 1 hour and then filtrated. A matter obtained was washed with 10 L of water and dried at 130° C. for 20 hours to obtain about 1 kg of a zirconium•titanium-substituted type zeolite (hereinafter referred to as "USY (V)"). The properties of USY (V) are shown in Table 2.

Further, a hydrocracking catalyst V containing USY (V) was prepared in the same manner as in Example 1. The properties of the hydrocracking catalyst V . . . are shown in Table 3.

TABLE 1

| USY | Silica-alumina ratio | Crystal lattice constant (nm) | Specific surface area (m²/g) | Crystallinity (%) |
|---|---|---|---|---|
| a | 5.2 | 2.438 | 635 | 98 |
| b | 30.2 | 2.436 | 710 | 105 |
| c | 30.1 | 2.436 | 712 | 105 |
| d | 30.2 | 2.438 | 710 | 105 |
| e | 30.1 | 2.435 | 708 | 103 |
| f | 15.5 | 2.437 | 705 | 104 |
| g | 15.6 | 2.437 | 702 | 103 |
| h | 126 | 2.434 | 703 | 101 |
| i | 125 | 2.434 | 705 | 101 |
| j | 30.8 | 2.428 | 585 | 88 |
| k | 30.5 | 2.428 | 583 | 87 |
| l | 29.5 | 2.455 | 685 | 98 |
| m | 29.3 | 2.454 | 688 | 97 |

TABLE 2

| | USY | Silica-alumina ratio | Crystal Lattice constant (nm) | Specific surface area (m²/g) | Crystallinity (%) | ZrO₂ (mass %) | HfO₂ (mass %) | TiO₂ (mass %) |
|---|---|---|---|---|---|---|---|---|
| Example 1 | A | 29.8 | 2.438 | 710 | 105 | 1.01 | — | — |
| Example 2 | B | 30.7 | 2.438 | 735 | 108 | — | 0.49 | — |
| Example 3 | C | 30.5 | 2.437 | 716 | 103 | 0.99 | 0.50 | — |
| Example 4 | D | 29.5 | 2.435 | 701 | 88 | 0.98 | 0.49 | 1.03 |
| Example 5 | E | 29.6 | 2.436 | 697 | 83 | 0.96 | — | 0.98 |
| Example 6 | F | 30.0 | 2.435 | 696 | 89 | — | 0.50 | 1.01 |
| Comparative Example 1 | G | 29.6 | 2.437 | 698 | 92 | — | — | 1.02 |
| Comparative Example 2 | H | 29.6 | 2.437 | 712 | 105 | 0.99 | — | — |
| Comparative Example 3 | I | 29.7 | 2.439 | 718 | 102 | 0.99 | — | — |
| Comparative Example 4 | J | 30.0 | 2.433 | 701 | 103 | 0.99 | — | — |
| Comparative Example 5 | K | 30.1 | 2.436 | 702 | 105 | 0.98 | — | — |
| Comparative Example 6 | L | 30.1 | 2.436 | 708 | 104 | 1.00 | — | — |
| Comparative Example 7 | M | 15.6 | 2.438 | 722 | 105 | 0.97 | — | — |
| Comparative Example 8 | N | 124.0 | 2.432 | 748 | 102 | 1.01 | — | — |
| Comparative Example 9 | O | 30.8 | 2.428 | 710 | 101 | 0.98 | — | — |
| Comparative Example 10 | P | 29.5 | 2.456 | 706 | 105 | 0.99 | — | — |
| Comparative Example 11 | Q | 29.9 | 2.437 | 714 | 106 | 0.10 | — | — |
| Comparative Example 12 | R | 30.0 | 2.437 | 708 | 103 | 6.03 | — | — |
| Comparative Example 13 | S | 30.5 | 2.436 | 733 | 107 | — | 0.13 | — |
| Comparative Example 14 | T | 30.3 | 2.437 | 704 | 99 | — | 6.02 | — |
| Comparative Example 15 | U | 29.8 | 2.437 | 700 | 105 | 0.98 | — | 0.12 |
| Comparative Example 16 | V | 30.0 | 2.436 | 696 | 93 | 0.99 | — | 6.04 |

TABLE 3

| | Catalyst | ZrO₂ (mass %) | HfO₂ (mass %) | TiO₂ (mass %) | MoO₃ (mass %) | NiO (mass %) | Specific surface area (m²/g) | Pore volume (ml/g) |
|---|---|---|---|---|---|---|---|---|
| Example 1 | A | 0.39 | — | — | 16.7 | 3.88 | 384 | 0.56 |
| Example 2 | B | — | 0.19 | — | 16.1 | 3.92 | 364 | 0.55 |

TABLE 3-continued

| | Catalyst | ZrO$_2$ (mass %) | HfO$_2$ (mass %) | TiO$_2$ (mass %) | MoO$_3$ (mass %) | NiO (mass %) | Specific surface area (m$^2$/g) | Pore volume (ml/g) |
|---|---|---|---|---|---|---|---|---|
| Example 3 | C | 0.40 | 0.20 | — | 16.0 | 3.90 | 372 | 0.54 |
| Example 4 | D | 0.41 | 0.21 | 0.39 | 16.3 | 3.78 | 380 | 0.56 |
| Example 5 | E | 0.39 | — | 0.40 | 16.2 | 3.82 | 375 | 0.52 |
| Example 6 | F | — | 0.20 | 0.40 | 16.4 | 3.72 | 366 | 0.58 |
| Comparative Example 1 | G | — | — | 0.41 | 15.7 | 3.84 | 364 | 0.51 |
| Comparative Example 2 | H | 0.38 | — | — | 16.4 | 3.75 | 368 | 0.54 |
| Comparative Example 3 | I | 0.39 | — | — | 15.9 | 3.73 | 379 | 0.51 |
| Comparative Example 4 | J | 0.38 | — | — | 16.4 | 3.75 | 368 | 0.54 |
| Comparative Example 5 | K | 0.39 | — | — | 16.2 | 3.80 | 376 | 0.51 |
| Comparative Example 6 | L | 0.38 | — | — | 16.1 | 3.85 | 375 | 0.50 |
| Comparative Example 7 | M | 0.40 | — | — | 16.0 | 3.90 | 380 | 0.51 |
| Comparative Example 8 | N | 0.41 | — | — | 15.7 | 3.83 | 357 | 0.53 |
| Comparative Example 9 | O | 0.42 | — | — | 16.5 | 3.82 | 382 | 0.57 |
| Comparative Example 10 | P | 0.40 | — | — | 15.9 | 3.83 | 383 | 0.53 |
| Comparative Example 11 | Q | 0.01 | — | — | 16.2 | 3.87 | 380 | 0.50 |
| Comparative Example 12 | R | 2.39 | — | — | 16.1 | 3.92 | 372 | 0.52 |
| Comparative Example 13 | S | — | 0.01 | — | 16.0 | 3.80 | 384 | 0.51 |
| Comparative Example 14 | T | — | 2.40 | — | 16.4 | 3.99 | 380 | 0.53 |
| Comparative Example 15 | U | 0.39 | — | 0.01 | 15.9 | 3.81 | 382 | 0.50 |
| Comparative Example 16 | V | 0.40 | — | 2.41 | 16.3 | 3.88 | 380 | 0.52 |

Test Example: Catalyst Activity Evaluation

Hydrocracking reactor was carried out on the conditions of a hydrogen partial pressure of 13 MPa, a liquid hourly space velocity of 0.26 hr$^{-1}$, a hydrogen-to-oil ratio (hydrogen/oil ratio) of 1250 Nm$^3$/kL and a reactor temperature of 370° C. using the catalysts A to X and hydrocarbon oils having properties shown in Table 4 as raw material oils by means of a fixed bed flow type reactor equipment manufactured by Xytel Corporation to determine decomposition rates according to the following equation (2) and middle distillate (kerosene and light oil) yields according to the following equation (3). The catalyst activities were evaluated according to the following procedures 1) and 2) based on the values of the decomposition rates and the middle distillate yields.

1) A ratio of a value of a decomposition rate of the other catalyst to a value of a decomposition rate of the catalyst A was determined and shown in terms of a relative decomposition rate, wherein a decomposition rate of the catalyst A was set to 100. The results thereof are shown in Table 5.

2) A ratio of a yield of the middle distillate of the other catalyst to a yield of the middle distillate of the catalyst A was determined and shown in terms of a relative yield of the middle distillate, wherein a yield of the middle distillate of the catalyst A was set to 100. The results thereof are shown in Table 5.

Decomposition rate (%)=(content (kg) of a fraction having a boiling point of higher than 375° C. in the produced oil)/(content (kg) of a fraction having a boiling point of higher than 375° C. in the raw oil)×100

Yield (%) of the middle distillate=(content (kg) of a fraction having a boiling point of 149 to 375° C. in the produced oil)/(content (kg) of a fraction having a boiling point of lower than 375° C. in the raw oil)×100

In this connection, "%" means "% by mass" in both of the decomposition rate and the middle distillate yield.

According to the results shown in Table 5, at least one side of the decomposition rates and the middle distillate yields in the catalysts (catalysts A to F) according to the present invention shows high values as compared with those of the catalysts (catalysts G to V) of the comparative examples, and the others than the above ones show at least the equivalent values. This means that a superiority of the catalysts according to the present invention is shown.

TABLE 4

| | |
|---|---|
| Specific gravity (g/ml) | 0.9203 |
| Sulfur content (mass %) | 2.23 |
| Nitrogen content (weight ppm) | 815 |
| C5 to 85° C. (mass %) | 0 |
| 85 to 149° C. (mass %) | 0 |
| 149 to 185° C. (mass %) | 0 |
| 185 to 240° C. (mass %) | 1.3 |
| 240 to 315° C. (mass %) | 2.7 |
| 315 to 375° C. (mass %) | 8.0 |
| 375 to 560° C. (mass %) | 79.5 |
| 560° C.+ (mass %) | 8.5 |

TABLE 5

| | Catalyst | Relative decomposition rate (%) | Relative middle distillate yield (%) |
|---|---|---|---|
| Example 1 | A | 100 | 100 |
| Example 2 | B | 99 | 97 |
| Example 3 | C | 99 | 96 |
| Example 4 | D | 100 | 95 |
| Example 5 | E | 99 | 96 |
| Example 6 | F | 100 | 96 |
| Comparative Example 1 | G | 99 | 91 |
| Comparative Example 2 | H | 98 | 93 |
| Comparative Example 3 | I | 97 | 92 |
| Comparative Example 4 | J | 96 | 89 |
| Comparative Example 5 | K | 98 | 91 |
| Comparative Example 6 | L | 98 | 91 |
| Comparative Example 7 | M | 97 | 91 |
| Comparative Example 8 | N | 99 | 89 |
| Comparative Example 9 | O | 99 | 90 |
| Comparative Example 10 | P | 97 | 92 |
| Comparative Example 11 | Q | 99 | 94 |
| Comparative Example 12 | R | 98 | 93 |
| Comparative Example 13 | S | 98 | 94 |
| Comparative Example 14 | T | 97 | 92 |
| Comparative Example 15 | U | 98 | 94 |
| Comparative Example 16 | V | 95 | 90 |

Example 7: Hydrocracking Catalyst W

Silica gel having 7 mass % of silica was obtained by addition of water glass having 8.5 mass % of silica to 25 mass % of sulfuric acid aqueous solution. On the other hand, alumina slurry was obtained by mixing 40 kg of sodium aluminium dioxide aqueous solution having 6.8 mass % of $Al_2O_3$ and 40 kg of aluminium sulfate aqueous solution having 2.4 mass % of $Al_2O_3$. Above described silica gel and alumina slurry were mixed in the mass ratio of 70:30, and stirred at 60° C. for 1 hour. After filtration, product was washed by 150 ml of aqueous ammonium solution of 0.3 mass % of ammonia in order to remove Na2SO4. Further, the product was diluted by water to produce 10 mass % of water slurry and its pH was controlled at 10.5 by addition of 15 mass % of aqueous ammonium solution. Then, it was stirred at 95° C. for 10 hours, being removed of water, washed and kneaded to provide silica-alumina product.

The silica-alumina obtained was mixed with USY(A) in the ratio of silica-alumina:USY=1.5:1 in dry mass base, then being kneaded, extruded to cylinder shape of 1.8 mm diameter, dried and calcined at 550° C. for 3 hours to provide support W.

Further, hydrocracking catalyst W was prepared by the same manner as example 1. Compositions and physical properties of hydrocracking catalyst W are shown in the Table 6.

TABLE 6

| | Catalyst | Inorganic oxide Alumina:Silica (mass ratio) | USY | Inorganic oxide:USY (mass ratio) | $ZrO_2$ (mass %) | $MoO_3$ (mass %) | NiO (mass %) | Specific surface area (m²/g) | Pore volume (ml/g) |
|---|---|---|---|---|---|---|---|---|---|
| Example 7 | W | 70:30 | A | 1.5:1 | 0.31 | 16.2 | 3.72 | 387 | 0.62 |
| Example 8 | X | 70:30 | A | 2:1 | 0.27 | 16.3 | 3.78 | 365 | 0.58 |
| Example 9 | Y | 30:70 | A | 2:1 | 0.26 | 16.5 | 3.87 | 380 | 0.61 |

Example 8: Hydrocracking Catalyst X

Silica gel having 7 mass % of silica was obtained by addition of water glass having 8.5 mass % of silica to 25 mass % of sulfuric acid aqueous solution. On the other hand, alumina slurry was obtained by mixing 40 kg of sodium aluminium dioxide aqueous solution having 6.8 mass % of $Al_2O_3$ and 40 kg of aluminium sulfate aqueous solution having 2.4 mass % of $Al_2O_3$. Above described silica gel and alumina slurry were mixed in the mass ratio of 70:30, and stirred at 60° C. for 1 hour. After filtration, product was washed by 150 ml of aqueous ammonium solution of 0.3 mass % of ammonia in order to remove Na2SO4. Further, the product was diluted by water to produce 10 mass % of water slurry and its pH was controlled at 10.5 by addition of 15 mass % of aqueous ammonium solution. Then, it was stirred at 95° C. for 10 hours, being removed of water, washed and kneaded to provide silica-alumina product.

The silica-alumina obtained was mixed with USY(A) in the ratio of silica-alumina:USY=2:1 in dry mass base, then being kneaded, extruded to cylinder shape of 1.8 mm diameter, dried and calcined at 550° C. for 3 hours to provide support X.

Further, hydrocracking catalyst X was prepared by the same method as example 1. Compositions and physical properties of hydrocracking catalyst X are shown in the Table 6.

Example 9: Hydrocracking Catalyst Y

Silica gel having 7 mass % of silica was obtained by addition of water glass having 8.5 mass % of silica to 25 mass % of sulfuric acid aqueous solution. On the other hand, alumina slurry was obtained by mixing 40 kg of sodium aluminium dioxide aqueous solution having 6.8 mass % of $Al_2O_3$ and 40 kg of aluminium sulfate aqueous solution having 2.4 mass % of $Al_2O_3$. Above described silica gel and alumina slurry were mixed in the mass ratio of 30:70, and stirred at 60° C. for 1 hour. After filtration, product was washed by 150 ml of aqueous ammonium solution of 0.3 mass % of ammonia in order to remove Na2SO4. Further, the product was diluted by water to produce 10 mass % of water slurry and its pH was controlled at 10.5 by addition of 15 mass % of aqueous ammonium solution. Then, it was stirred at 95° C. for 10 hours, being removed of water, washed and kneaded to provide silica-alumina product.

The silica-alumina obtained was mixed with USY(A) in the ratio of silica-alumina:USY=2:1 in dry mass base, then being kneaded, extruded to cylinder shape of 1.8 mm diameter, dried and calcined at 550° C. for 3 hours to provide support Y.

Further, hydrocracking catalyst Y was prepared by the same method as example 1. Compositions and physical properties of hydrocracking catalyst Y are shown in the Table 6.

Activity of the prepared catalyst W, X and Y were evaluated by using the same method as above described. The results are shown in Table 7.

TABLE 7

| Catalyst | | Relative decomposition rate (%) | Relative middle distillate yield (%) |
|---|---|---|---|
| Example 7 | W | 102 | 98 |
| Example 8 | X | 98 | 106 |
| Example 9 | Y | 102 | 105 |

As can be seen in Table 7, high cracking activity and middle distillate selectivity are obtained for the catalysts having alumina-silica as support as well as alumina support. Generally speaking, in comparison with alumina, since alumina-silica has relatively strong acidic site, it has higher cracking activity in spite of lower USY zeolite content. As a result, alumina-silica has higher middle distillate selectivity than alumina with USY zeolite.

The present invention shall not be restricted to the embodiments described above and can be changed as long as the scope of the present invention is not changed. For example, cases in which a part or all of the respective embodiments and modification examples each described above are combined to constitute the hydrocracking catalysts for hydrocarbon oil according to the present invention and the hydrotreating method in which the above catalysts are used are included as well in the scope of right in the present invention.

For example, in the hydrocracking catalysts for hydrocarbon oil in the embodiments described above, the hydrocracking catalyst for hydrocarbon oil according to the present invention may be mixed in advance with the catalyst (Y) to fill the catalyst filling baths of the respective stages with the mixed catalyst.

What is claimed is:

1. A hydrocracking catalyst for the high boiling fraction containing hydrocarbon oil comprising a hydrogenative metal component carried on a support containing an ultra-stable Y-type zeolite,
    wherein the ultra-stable Y-type zeolite is a framework-substituted zeolite (hereinafter referred to as a framework-substituted zeolite-1) in which a part of aluminum atoms constituting a zeolite framework thereof is substituted with zirconium atoms and titanium ions,
    said zeolite-1 has a crystallinity of 80% or more, and contains from 0.1 to 5 mass % zirconium atoms and from 0.1-5 mass % titanium atoms as calculated as the oxide basis, and
    a relative decomposition rate as defined below is 99% or more, and a relative middle distillate yield as defined below is 95% or more:
    (Relative decomposition rate and relative middle distillate yield)
    hydrocarbon oil as raw material oil is subjected to hydrocracking on the conditions of a hydrogen partial pressure of 13 MPa, a liquid hourly space velocity of 0.26 $hr^{-1}$, a hydrogen-to-oil ratio (hydrogen/oil ratio) of 1,250 $Nm^3/kL$, and a reaction temperature of 370° C. to obtain produced oil; a decomposition rate is calculated according to an equation (2) as defined below; a middle distillate yield is calculated according to an equation (3) as defined below; the relative decomposition rate is a relative value of the decomposition rate with the proviso that a decomposition rate obtained through hydrocracking with a use of a hydrocracking catalyst A as defined below is taken as a base of 100; and the relative middle distillate yield is a relative value of the middle distillate yield with the proviso that a middle distillate yield obtained through hydrocracking with a use of the hydrocracking catalyst A as defined below is taken as a base of 100;

Decomposition rate (%)={1−(Content (kg) of a fraction having a boiling point of higher than 375° C. in the produced oil/Content (kg) of a fraction having a boiling point of higher than 375° C. in the raw oil)}×100     Equation (2):

Middle distillate yield (%)={Content (kg) of a fraction having a boiling point of 149 to 375° C. in the produced oil/Content (kg) of a fraction having a boiling point of lower than 375° C. in the raw oil}×100     Equation (3):

(Hydrocracking catalyst A)

40 kg of a sodium aluminate aqueous solution having 6.8 mass % of $Al_2O_3$ and 40 kg of an aluminum sulfate aqueous solution having 2.4 mass % of $Al_2O_3$ are mixed; the resultant mixture is diluted with water to have 10 mass % of $Al_2O_3$; pH is adjusted with aqueous ammonia to 10.5; an alumina knead product that has been obtained by kneading with a kneader is mixed with a zirconium-substituted zeolite (USY(A)) as defined below at a dry mass ratio of 1:1; the mixture is formed into a columnar shape having a diameter or 1.8 mm; the columnar article is fired at 550° C. for 3 hours to thereby obtain a support A, 700 ml of water is added to 201.3 g of molybdenum trioxide and 90.4 g of nickel carbonate as hydrogenative metal components to thereby prepare an aqueous solution; the support A is impregnated with the aqueous solution; the resultant article is fired in air at 550° C. for 1 hour to thereby obtain a catalyst as hydrocracking catalyst A;

(Zirconium-substituted zeolite (USY(A))

50.0 kg of a NaY-type zeolite having a $SiO_2/Al_2O_3$ molar ratio of 5.2, a crystal lattice constant of 2.466 nm, a specific surface area of 720 m$^2$/g, and a $Na_2O$ content of 13.0 mass % is suspended in 500 liters of water at 60° C.; 14.0 kg of ammonium sulfate is added thereto to thereby prepare a Y-type zeolite ($NH_4^{65}Y$) in which 65% of sodium contained in the NaY-type zeolite has been ion-exchanged with ammonium ion;

40 kg of the Y-type zeolite ($NH_4^{65}Y$) is fired in a saturated steam atmosphere at 670° C. for 1 hour to obtain a hydrogen type Y-type zeolite, which is then suspended in water at 60° C.; and 49.0 kg of ammonium sulfate is added thereto to thereby prepare a Y-type zeolite ($NH_4^{95}Y$) in which 95% of Na contained in the NaY-type zeolite was ion-exchanged with $NH_4$;

33.0 kg of the Y-type zeolite ($NH_4^{95}Y$) is fired in a saturated steam atmosphere at 650° C. for 1 hour to thereby prepare a ultra-stable Y-type zeolite (USY(a)) having a $SiO_2/Al_2O_3$ molar ratio of 5.2 and a $Na_2O$ content of 0.60 mass %;

26.0 kg of the ultra-stable Y-type zeolite (USY(a)) is suspended in water at 60° C.; 61.0 kg of 25 mass % sulfuric acid is added thereto to thereby prepare a ultra-stable Y-type zeolite (USY(b)), the ultra-stable Y-type zeolite (USY(b)) is fired at 600° C. for 1 hour to thereby prepare a ultra-stable Y-type zeolite (USY(c)), and 1 kg of the ultra-stable Y-type zeolite (USY(c)) is suspended in water at 25° C.; pH of the suspension is adjusted to 1.6 with 25 mass % sulfuric acid; 86 g of a solution containing 18 mass % zirconium sulfate is added and mixed thereto, to thereby obtain a zirconium-substituted zeolite as zirconium-substituted zeolite (USY(A)).

2. The hydrocracking catalyst for the high boiling fraction containing B hydrocarbon oil according to claim 1, wherein said zeolite-1 further comprises from 0.1 to 5 mass % hafnium atoms as calculated as the oxide basis.

3. A hydrocracking catalyst for the high boiling fraction containing hydrocarbon oil comprising a hydrogenative metal component carried on a support containing an ultra-stable Y-type zeolite, wherein the ultra-stable Y-type zeolite is a framework-substituted zeolite (hereinafter referred to as a framework-substituted zeolite-1) in which a part of aluminum atoms constituting a zeolite framework thereof is substituted with zirconium atoms and/or hafnium atoms, said zeolite-1 further contains titanium atoms, said zeolite-1 contains from 0.1 to 5 mass % titanium atoms as calculated as the oxide basis, and the relative decomposition rate as defined in claim 1 is 99% or more, and the relative middle distillate yield as defined in claim 1 is 95% or more.

4. The hydrocracking catalyst for the high boiling fraction containing hydrocarbon oil according to claim 3, wherein said zeolite-1 contains from 0.1 to 5 hafnium atoms as calculated as the oxide basis.

5. The hydrocracking catalyst for the high boiling fraction containing hydrocarbon oil according to claim 4, wherein in the zeolite-1, a part of the aluminum atoms forming the zeolite framework is further substituted with titanium atoms.

6. The hydrocracking catalyst for the high boiling fraction containing hydrocarbon oil according to claim 5, wherein the support contains the zeolite-1 and inorganic oxide excluding the zeolite-1.

7. The hydrocracking catalyst for the high boiling fraction containing hydrocarbon oil according to claim 6, wherein the inorganic oxides are alumina and/or silica-alumina.

8. A hydrocracking catalyst for the high boiling fraction containing hydrocarbon oil comprising a hydrogenative metal component carried on a support containing an ultra-stable Y-type zeolite, wherein the ultra-stable Y-type zeolite is a framework-substituted zeolite (hereinafter referred to as a framework-substituted zeolite-1) in which a part of aluminum atoms constituting a zeolite framework thereof is substituted with zirconium atoms and/or hafnium atoms, the support further contains a titanium-substituted zeolite having a crystallinity of 80% or more (hereinafter referred to as a framework-substituted zeolite-2), in which at least a part of aluminum atoms constituting a framework of the ultra-stable Y-type zeolite is substituted only with titanium atoms, and the relative decomposition rate as defined in claim 1 is 99% or more, and the relative middle distillate yield as defined in claim 1 is 95% or more.

9. The hydrocracking catalyst for the high boiling fraction containing hydrocarbon oil according to claim 8, wherein said framework-substituted zeolite-2 contains from 0.1 to 5 mass % titanium atoms as calculated as the oxide basis.

10. The hydrocracking catalyst for the high boiling fraction containing hydrocarbon oil according to claim 1, wherein the support comprises the framework zeolite-1, the framework-substituted zeolite-2 and inorganic oxide excluding the framework-substituted zeolite-1 and the framework-substituted zeolite-2.

11. A hydrocracking catalyst for the high boiling fraction containing hydrocarbon oil comprising a hydrogenative metal component carried on a support containing an ultra-stable Y-type zeolite, wherein the ultra-stable Y-type zeolite is a framework-substituted zeolite (hereinafter referred to as a framework-substituted zeolite-1) in which a part of aluminum atoms constituting a zeolite framework thereof is substituted with from 0.1-5 mass % of titanium atoms and from 0.1-5 mass % of zirconium atoms, the framework zeolite-1 has the following characteristics of (a) to (c):
(a) a crystal lattice constant of 2.430 to 2.450 nm,
(b) a specific surface area of 600 to 900 m$^2$/g, and
(c) a molar ratio of SiO$_2$ to Al$_2$O$_3$ of 20 to 100, and
the relative decomposition rate as defined in claim 1 is 99% or more, and the relative middle distillate yield as defined in claim 1 is 95% or more.

12. A hydrocracking catalyst for the high boiling fraction containing hydrocarbon oil comprising a hydrogenative metal component carried on a support containing an ultra-stable Y-type zeolite,
wherein the ultra-stable Y-type zeolite is a framework-substituted zeolite (hereinafter referred to as a framework-substituted zeolite-1) in which a part of aluminum atoms constituting a zeolite framework thereof is substituted with from 0.1-5 mass % of titanium atoms and from 0.1-5 mass % of zirconium atoms,
in said catalyst, a specific surface area falls in a range of 200 to 450 m$^2$/g; a volume of pores having a diameter of 600 Å or less falls in a range of 0.40 to 0.75 ml/g; and an amount of the hydrogenative metal component falls in a range of 0.01 to 40 mass %, and
the relative decomposition rate as defined in claim 1 is 99% or more, and the relative middle distillate yield as defined in claim 1 is 95% or more.

13. A method for producing a hydrocracking catalyst for the high boiling fraction containing hydrocarbon oil, the hydrocracking catalyst being defined in claim 1,
wherein the zeolite-1 is obtained by:
firing an ultra-stable Y-type zeolite at 500° C. to 700° C., the ultra-stable Y-type zeolite having a crystal lattice constant falling in a range of 2.430 nm or more and 2.450 nm or less, a specific surface area of 600 to 900 m$^2$/g, and a molar ratio of SiO$_2$ to Al$_2$O$_3$ of 20 to 100;
forming a suspension containing the fired ultra-stable Y-type zeolite, the suspension having a liquid/solid mass ratio of 5 to 15;
adding inorganic acid or organic acid so that a pH of the above suspension is 1.0 to 2.0,
subsequently adding a zirconium compound and a titanium compound and mixing them; and neutralizing the above mixed solution.

14. The method for producing a hydrocracking catalyst for the high boiling fraction containing hydrocarbon oil according to claim 13, wherein the zeolite-1 is obtained by firing at 500 to 700° C., an ultra-stable Y-type zeolite having a crystal lattice constant falling in a range of 2.430 nm or more and 2.450 nm or less, a specific surface area of 600 to 900 m$^2$/g and a molar ratio of 20 to 100 in terms of SiO$_2$ to Al$_2$O$_3$, preparing a suspension having a mass ratio of 5 to 15 in terms of liquid/solid from the above fired ultra-stable Y-type zeolite, adding an inorganic acid or an organic acid thereto so that a pH of the above suspension is 1.0 to 2.0, subsequently adding a zirconium compound and a titanium compound and mixing them and then neutralizing the mixed solution.

15. A method for hydrocracking hydrocarbon oil, comprising: hydrocracking hydrocarbon oil with a hydrocracking catalyst for the high boiling fraction containing hydrocarbon oil of claim 1,
further comprising:
filling a hydrotreating apparatus which is a flow reactor with the hydrocracking catalyst;
treating a hydrocarbon oil having a boiling point of 375° C. to 833° C. in the presence of hydrogen at a reactor temperature of 300° C. to 500° C., a hydrogen pressure of 4 to 30 MPa, a liquid hourly space velocity (LHSV) of 0.1 to 10 h$^{-1}$, and a hydrogen/oil ratio of 500 to 2,500 Nm$^3$/m$^3$; and
using the hydrotreating apparatus for hydrotreating hydrocarbon oil including three catalyst filled tanks connected in series, wherein at least the second of said three catalyst filled tanks contains said hydrocracking catalyst for the high boiling fraction containing hydrocarbon oil.

16. The method for hydrocracking hydrocarbon oil according to claim 15, wherein the hydrocarbon oil described above contains refined oil obtained from crude oil, synthetic crude oil, bitumen, oil sand, shale oil or coal oil, and the above refined oil is any of a) vacuum gas oil (VGO), b) deasphalted oil (DAO) obtained from a solvent deasphalting process or demetalized oil, c) light coker gas oil or heavy coker gas oil obtained from a coker process, d) cycle oil obtained from a fluid catalytic cracking (FCC) process or e) gas oil obtained from a visbraking process.

17. A method for hydrocracking hydrocarbon oil, comprising: hydrocracking hydrocarbon oil with a hydrocracking catalyst for the high boiling fraction containing hydrocarbon oil of claim 1,
further comprising:
filling a hydrotreating apparatus which is a flow reactor with the hydrocracking catalyst; and
treating a hydrocarbon oil having a boiling point of 375° C. to 650° C. in the presence of hydrogen at a reactor temperature of 330° C. to 450° C., a hydrogen pressure of 7 to 15 MPa, a liquid hourly space velocity (LHSV) of 0.2 to 1.5 h$^{-1}$, and a hydrogen/oil ratio of 1,000 to 2,000 Nm$^3$/m$^3$ to afford kerosene-gas oil.

18. The method for hydrocracking hydrocarbon oil according to claim 17, herein the flow reactor described above is a flow reactor selected from a group consisting of a stirred tank, an ebullient bed reactor, a baffled slurry tank, a fixed bed reactor, a rotating tubular reactor and a slurry-bed reactor.

19. The method for hydrocracking hydrocarbon oil according to claim 18, wherein the hydrocarbon oil described above contains refined oil obtained from (1) crude oil, (2) synthetic crude oil, (3) bitumen, (4) oil sand, (5) shale oil or (6) coal oil.

\* \* \* \* \*